(12) United States Patent
Zhang

(10) Patent No.: US 6,437,823 B1
(45) Date of Patent: Aug. 20, 2002

(54) METHOD AND SYSTEM FOR CALIBRATING DIGITAL CAMERAS

(75) Inventor: Zhengyou Zhang, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/303,340

(22) Filed: Apr. 30, 1999

(51) Int. Cl.[7] .............................................. H04N 17/00
(52) U.S. Cl. ...................................... 348/187; 348/188
(58) Field of Search ................................ 348/180, 187, 348/188; H04N 17/00

(56) References Cited

U.S. PATENT DOCUMENTS 5,699,440 A * 12/1997 Carmeli ...................... 348/180

OTHER PUBLICATIONS

S. Bougnoux. From projective to euclidean space under any practical situation, a criticism of self–calibration. In Proceedings of the 6th International Conference on Computer Vision, pp. 790–796, Jan. 1998.

D. C. Brown. Close–range camera calibration. Photogrammetric Engineering, 37(8):855–866, 1971.

B. Caprile and V. Torre. Using Vanishing Points for Camera Calibration. The International Journal of Computer Vision, 4(2):127–140, Mar. 1990.

W. Faig. Calibration of close–range photogrammetry systems: Mathematical formulation. Photogrammetric Engineering and Remote Sensing, 41(12):1479–1486, 1975.

O. Faugeras, T. Luong, and S. Maybank. Camera self–calibration: theory and experiments. In G. Sandini, editor, Proc 2nd ECCV, vol. 588 of Lecture Notes in Computer Science, pp. 321–334, Santa Margherita Ligure, Italy, May 1992. Springer–Verlag.

O. Faugeras and G. Toscani. The calibration problem for stereo. In Proceedings of the IEEE Conference on Computer Vision and Pattern Recognition, pp. 15–20, Miami Beach, FL, Jun. 1986. IEEE.

S. Ganapathy. Decomposition of transformation matrices for robot vision. Pattern Recognition Letters, 2:401–412, Dec. 1984.

D. Gennery. Stereo–camera calibration. In Proceedings of the 10th Image Understanding Work–shop, pp. 101–108, 1979.

(List continued on next page.)

Primary Examiner—Sherrie Hsia
(74) Attorney, Agent, or Firm—Lyon & Harr, LLP; Richard T. Lyon

(57) ABSTRACT

A digital camera is calibrated by establishing the coordinates of at least four feature points of a pattern mounted on a planar surface. At least two, and preferably three or more, images of the planar pattern are captured at different, non-parallel orientations using the digital camera. The image coordinates of the pattern's feature points are then identified in the captured images. A closed form solution can be employed to derive all the intrinsic and extrinsic parameters needed to provide the camera calibration. Essentially, the known pattern coordinates and corresponding image coordinates are used to compute a homography for each image. Then, a process is employed that estimates the intrinsic camera parameters by analyzing the homographies associated with each image. Finally, the extrinsic parameters for each image are computed from the intrinsic parameters and the homographies. However, the images can be effected by various noise sources which could affect the accuracy of the closed form solution process. If higher accuracy is called for, a maximum likelihood inference process can be employed to either provide a more accurate first estimate, or to refine the estimates derived from the closed form solution. If radial distortion caused by the lens of the camera is also a concern, the camera parameters can be further refined by taking into account this distortion.

42 Claims, 18 Drawing Sheets

OTHER PUBLICATIONS

R. Hartley. Self–calibration from multiple views with a rotating camera. In J.–O. Eklundh, editor, Proceedings of the 3rd European Conference on Computer Vision, vol. 800–801 of Lecture Notes in Computer Science, pp. 471–478, Stockholm, Sweden, May 1994. Springer–Verlag.

R. Hartley. In defense of the 8–point algorithm. In Proceedings of the 5th International Conference on Computer Vision, pp. 1064–1070, Boston, MA, Jun. 1995. IEEE Computer Society Press.

R. I. Hartley. An algorithm for self calibration from several views. In Proceedings of the IEEE Conference on Computer Vision and Pattern Recognition, pp. 908–912, Seattle, WA, Jun. 1994. IEEE.

D. Liebowitz and A. Zisserman. Metric rectification for perspective images of planes. In Proceedings of the IEEE Conference on Computer Vision and Pattern Recognition, pp. 482–488, Santa Barbara, California, Jun. 1998. IEEE Computer Society.

O.–T. Luong and O. Faugeras. Self–calibration of a moving camera from point correspondences and fundamental matrices. The International Journal of Computer Vision, 22(3):261–289, 1997.

S. J. Maybank and O. D. Faugeras. A theory of self–calibration of a moving camera. The International Journal of Computer Vision, 8(2):123–152, Aug. 1992.

J. More. The levenberg–marquardt algorithm, implementation and theory. In G. A. Watson, editor, Numerical Analysis, Lecture Notes in Mathematics 630. Springer–Verlag, 1977.

I. Shimizu, Z. Zhang, S. Akamatsu, and K. Deguchi. Head pose determination from one image using a generic model. In Proceedings of the IEEE Third International Conference on Automatic Face and Gesture Recognition, pp. 100–105, Nara, Japan, Apr. 1998.

G. Stein. Accurate internal camera calibration using rotation, with analysis of sources of error. In Proc. Fifth International Conference on Computer Vision, pp. 230–236, Cambridge, Massachusetts, Jun. 1995.

B. Triggs. Autocalibration from planar scenes. In Proceedings of the 5th European Conference on Computer Vision, pp. 89–105, Freiburg, Germany, Jun. 1998.

R. Y. Tsai. A versatile camera calibration technique for high–accuracy 3D machine vision metrology using off–the–shelf tv cameras and lenses. IEEE Journal of Robotics and Automation, 3(4):323–344, Aug. 1987.

G. Wei and S. Ma. A complete two–plane camera calibration method and experimental comparisons. In Proc. Fourth International Conference on Computer Vision, pp. 439–446, Berlin, May 1993.

G. Wei and S. Ma. Implicit and explicit camera calibration: Theory and experiments. IEEE Transactions on Pattern Analysis and Machine Intelligence, 16(5):469–480, 1994.

J. Weng, P. Cohen, and M. Herniou. Camera calibration with distortion models and accuracy evaluation. IEEE Transactions on Pattern Analysis and Machine Intelligence, 14(10):965–980, Oct. 1992.

Z. Zhang. Motion and structure from two perspective views: From essential parameters to euclidean motion via fundamental matrix. Journal of the Optical Society of America A, 14(11):2938–2950, 1997.

* cited by examiner

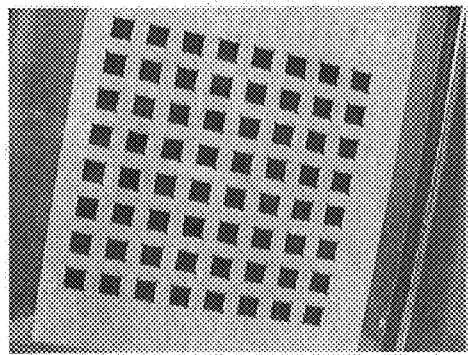
FIG. 10(e)
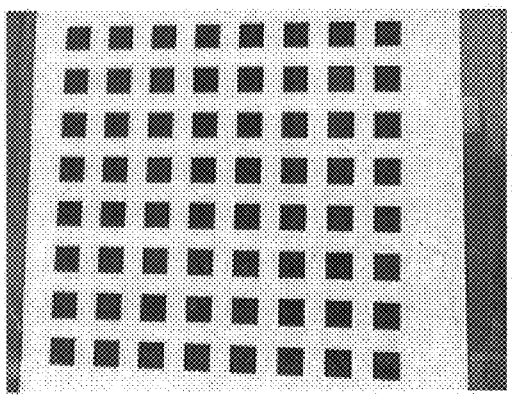 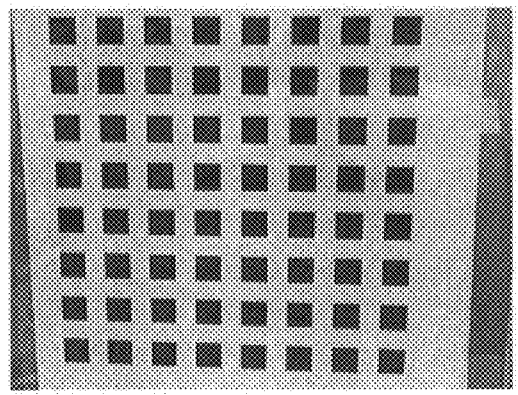
FIG. 12(a)  FIG. 12(b)

| nb | 2 images | | 3 images | | | 4 images | | | 5 images | | |
|---|---|---|---|---|---|---|---|---|---|---|---|
| | initial | final | σ | initial | final | σ | initial | final | σ | initial | final | σ |
| $\alpha$ | 825.59 | 830.47 | 4.74 | 917.65 | 830.80 | 2.06 | 876.62 | 831.81 | 1.56 | 877.16 | 832.50 | 1.41 |
| $\beta$ | 825.26 | 830.24 | 4.85 | 920.53 | 830.69 | 2.10 | 876.22 | 831.82 | 1.55 | 876.80 | 832.53 | 1.38 |
| $\gamma$ | 0 | 0 | 0 | 2.2956 | 0.1676 | 0.109 | 0.0658 | 0.2867 | 0.095 | 0.1752 | 0.2045 | 0.078 |
| $u_0$ | 295.79 | 307.03 | 1.37 | 277.09 | 305.77 | 1.45 | 301.31 | 304.53 | 0.86 | 301.04 | 303.96 | 0.71 |
| $v_0$ | 217.69 | 206.55 | 0.93 | 223.36 | 206.42 | 1.00 | 220.06 | 206.79 | 0.78 | 220.41 | 206.59 | 0.66 |
| $k_1$ | 0.161 | −0.227 | 0.006 | 0.128 | −0.229 | 0.006 | 0.145 | −0.229 | 0.005 | 0.136 | −0.228 | 0.003 |
| $k_2$ | −1.955 | 0.194 | 0.032 | −1.986 | 0.196 | 0.034 | −2.089 | 0.195 | 0.028 | −2.042 | 0.190 | 0.025 |
| RMS | 0.761 | 0.295 | | 0.987 | 0.393 | | 0.927 | 0.361 | | 0.881 | 0.335 | |

FIG. 11

METHOD AND SYSTEM FOR CALIBRATING DIGITAL CAMERAS

BACKGROUND

1. Technical Field

The invention is related to a computer-implemented system and process for calibrating digital cameras, and more particularly, to a system and process for calibrating digital cameras using only images of a pattern on a planar surface captured by the camera.

2. Background Art

Camera calibration is a necessary step in 3D computer vision in order to extract metric information from 2D images. Much work has been done, starting in the photogrammetry community [2, 4], and more recently in computer vision [9, 8, 23, 7, 26, 24, 17, 6]. These techniques can be classified roughly into two categories: photogrammetric calibration and self-calibration.

Photogrammetric camera calibration is performed by observing a calibration object whose geometry in 3-D space is known with very good precision. Calibration can be done very efficiently [5]. The calibration object usually consists of two or three planes orthogonal to each other. Sometimes, a plane undergoing a precisely known translation is also used [23]. These approaches require an expensive calibration apparatus, and an elaborate setup.

Self-calibration techniques do not use any calibration object. Just by moving a camera in a static scene, the rigidity of the scene provides in general two constraints [15, 17] on the cameras' internal parameters from one camera displacement by using image information alone. Therefore, if images are taken by the same camera with fixed internal parameters, correspondences between three images are sufficient to recover both the internal and external parameters which allow the reconstruction of 3-D structure up to a similarity [16, 13]. While this approach is very flexible, it is not yet mature [1]. Because there are many parameters to estimate, reliable results cannot always be obtained. Other related techniques also exist such as vanishing points for orthogonal directions [3, 14], and calibration from pure rotation [11, 21].

More recently a self-calibration technique [22] was developed that employed at least 5 views of a planar scene to calibrate a digital camera. Unfortunately, this technique has proved to be difficult to initialize. Liebowitz and Zisserman [14] described a technique of metric rectification for perspective images of planes using metric information such as a known angle, two equal though unknown angles, and a known length ratio. They also mentioned that calibration of the internal camera parameters is possible provided at least three such rectified planes, although no experimental results were shown.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [2, 4]. A listing of the publications corresponding to each designator can be found at the end of the Detailed Description section.

SUMMARY

The present invention relates to a flexible new technique to easily calibrate a camera that overcomes the problems of current methods. It is well suited for use without specialized knowledge of 3D geometry or computer vision. In general terms, the technique involves capturing images of a planar pattern from at least two different non-parallel orientations. It is not necessary that any particular pattern be used, or even the same pattern be used for each of the captured images. The only requirement is that the coordinates of a number of feature points on the pattern plane are known. The pattern can be printed on a laser printer and attached to a "reasonable" planar surface (e.g., a hard book cover). Compared with classical techniques, the proposed technique is considerably more flexible. Compared with self-calibration, it gains a considerable degree of robustness.

This new calibration technique is generally focused on a desktop vision system (DVS). Such cameras are becoming cheap and ubiquitous. However, a typical computer user will perform vision tasks only from time to time, so will not be willing to invest money for expensive calibration equipment. Therefore, flexibility, robustness and low cost are important.

The calibration process embodying the present invention begins by determining the 2D coordinates of at least 4 feature points on the planar pattern. Next, at least two, and preferably three or more, images of the planar pattern (if the same one is used for all the images) are captured at different (non-parallel) orientations using the digital camera being calibrated. It is noted that either the pattern can be reoriented and the camera held stationary, or the pattern held stationary and the camera moved. The specifics of the motion need not be known. The image coordinates of the aforementioned 2D feature points of the planar pattern are then identified in the captured images using conventional image processing techniques. If three or more images have been captured, a closed form solution exists that can be solved to derive all the intrinsic and extrinsic parameters needed to provide the camera calibration. Essentially, the known pattern coordinates and corresponding image coordinates are used to compute a homography for each image. Then, a process is employed that estimates the intrinsic camera parameters by analyzing the homographies associated with each image. Finally, the extrinsic parameters for each image are computed from the intrinsic parameters and the homographies.

Of course, the images can be effected by various noise sources. For example, the camera resolution can be a source of noise. The process used to identify the coordinates of the feature points as they appear in the images may also not provide absolutely accurate results. Thus, the closed form solution may not be exact. If higher accuracy is called for, steps can be taken to provide a more precise estimate of camera calibration. For example, a maximum likelihood inference process (which is essentially a non-linear minimization procedure) can be employed to either provide a more accurate first estimate, or to refine the estimates derived from the closed form solution algorithm. In the former case, an initial guess is used for the unknown intrinsic and external parameters, while in the latter case the parameters estimated using the closed form solution procedure are employed.

If lens distortion is also a concern, as it is with most inexpensive desktop digital cameras, the camera parameters can be further refined by taking into account this distortion. As it is believed radial distortion is the dominant component of lens distortion, all other sources can be ignored. It is possible to first determine the camera parameters using any of the foregoing techniques and then employ what amounts to a least squares analysis to ascertain the radial distortion coefficients. These coefficients can then be used to compensate for the radial distortion in the camera parameter estimates. However, it can be more efficient and faster to determine the radial distortion coefficients along with the camera parameters using an expanded maximum likelihood inference process.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIGS. 10(A)–(E) are images of a pattern on a planar surface captured at different orientations in space.

FIG. 11 is a table providing estimates of camera parameters resulting from the use of various versions of the present invention.

FIGS. 12(A)–(B) are images of the pattern of FIG. 10(A)–(E) which have been corrected for radial distortion using the estimated parameters derived in accordance with the estimation process of FIG. 2.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
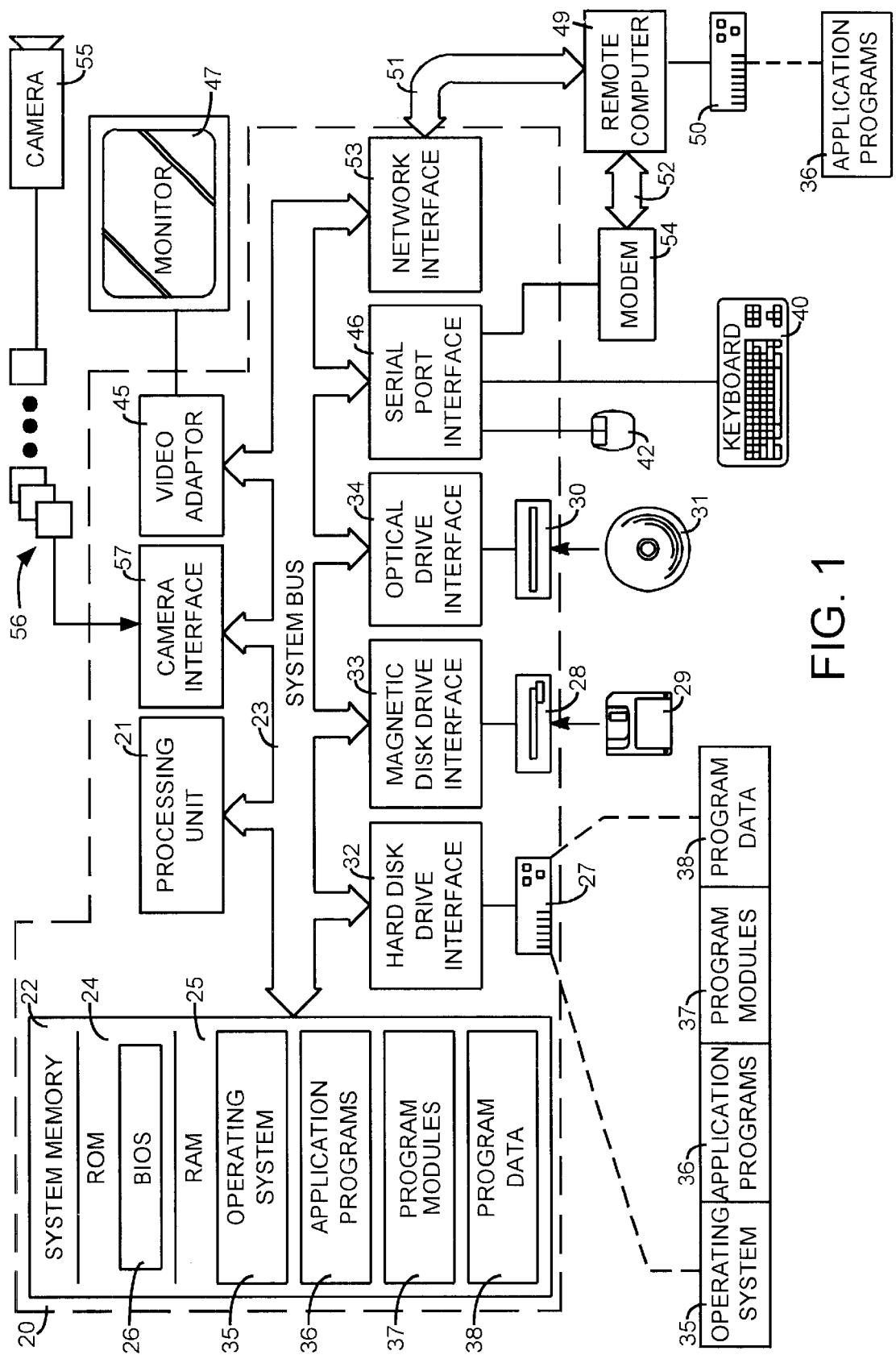
FIG. 1 is a diagram depicting a general purpose computing device constituting an exemplary system for implementing the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The exemplary operating environment having now been discussed, the remaining part of this description section will be devoted to a description of the program modules embodying the invention and the testing of these modules.

1. Basic Equations

The constraints on the camera's intrinsic parameters will be derived in the following section by observing a single plane.

1.1 Notation

A 2D point is denoted by $m=[u, v]^T$. A 3D point is denoted by $M=[X, Y, Z]^T$. The term $\tilde{x}$ is used to denote the augmented vector by adding 1 as the last element: $\tilde{m}=[u, v, 1]^T$ and $\tilde{M}=[X, Y, Z1]^T$. A camera is modeled by the usual pinhole: the relationship between a 3D point M and its image projection m is given by $$s\tilde{m}=A[R\ t]\tilde{M}, \quad (1)$$

where s is an arbitrary scale factor, (R, t), called the extrinsic parameters, is the rotation and translation which relates the world coordinate system to the camera coordinate system, and A, called the camera intrinsic matrix, is given by $$A = \begin{bmatrix} \alpha & \gamma & u_0 \\ 0 & \beta & v_0 \\ 0 & 0 & 1 \end{bmatrix}$$

with $(u_0, v_0)$ the coordinates of the principle point, $\alpha$ and $\beta$ the scale factors in images u and v axes, and $\gamma$ the parameter describing the skewness of the two image axes.

Finally, the abbreviation $A^{-T}$ will be used for $(A^{-1})^T$ or $(A^T)^{-1}$.

1.2 Homography Between the Model Plane and Its Image

Without loss of generality, it can be assumed the model plane is on Z=0 of the world coordinate system. Denote the $i^{th}$ column of the rotation matrix R by $r_i$. From (1), $$s \begin{bmatrix} u \\ v \\ 1 \end{bmatrix} = A[r_1\ r_2\ r_3\ t] \begin{bmatrix} X \\ Y \\ 0 \\ 1 \end{bmatrix}$$

$$= A[r_1\ r_2\ t] \begin{bmatrix} X \\ Y \\ 1 \end{bmatrix}.$$

By abuse of notation, M is still used to denote a point on the model plane, but $M=[X, Y]^T$ since Z is always equal to 0. In turn, $\tilde{M}=[X, Y, 1]^T$. Therefore, a model point M and its image m is related by a homography H:

$$s\tilde{m}=H\tilde{M} \text{ with } H=A[r_1\ r_2\ t]. \quad (2)$$

As is clear, the 3×3 matrix H is defined up to a scale factor.

1.3 Constraints on the Intrinsic Parameters

Given an image of the model plane, an homography can be estimated. There are many ways to estimate the homography between the model plane and its image. Here, the preferred technique is based on maximum likelihood criterion. Let $M_i$ and $m_i$ be the model and image points, respectively. Ideally, they should satisfy Equation (2). In practice, they don't because of noise in the extracted image points. Assume that $m_i$ is corrupted by Gaussian noise with mean 0 and covariance matrix $\Lambda m_i$. Then, the maximum likelihood estimation of H is obtained by minimizing the following functional $$\sum_i (m_i - \hat{m}_i)^T \Lambda_{m_i}^{-1} (m_i - \hat{m}_i),$$

where $$\hat{m}_i = \frac{1}{\bar{h}_3^T M_i} \begin{bmatrix} \bar{h}_1^T M_i \\ \bar{h}_2^T M_i \end{bmatrix} \text{ with } \bar{h}_i, \text{ the } i^{th} \text{ row of } H.$$

In practice, it is simply assumed $\Lambda m_i = \sigma^2 I$ for all i. This is reasonable if points are extracted independently with the same procedure. In this case, the above problem becomes a nonlinear least-squares one, i.e., $$\min_H \sum_i \|m_i - \hat{m}_i\|^2.$$

The nonlinear minimization is conducted with the Levenberg-Marquardt Algorithm as implemented in Minpack [18]. This requires an initial guess, which can be obtained as follows. Let $$x = [\bar{h}_1^T, \bar{h}_2^T, \bar{h}_3^T]^T$$

Then equation (2) can be rewritten as $$\begin{bmatrix} \tilde{M}^T & 0^T & -u\tilde{M}^T \\ 0^T & \tilde{M}^T & -v\tilde{M}^T \end{bmatrix} x = 0.$$

When given n points, there are n above equations, which can be written in matrix equation form as Lx=0, where L is a 2n×9 matrix. As x is defined up to a scale factor, the solution is well known to be the right singular vector of L associated with the smallest singular value (or equivalently, the eigenvector of $L^T L$ associated with the smallest eigenvalue).

In L, some elements are constant 1, some are in pixels, some are in world coordinates, and some are multiplication of both. This makes L poorly conditioned numerically. Much better results can be obtained by performing a simple data normalization, such as the one proposed in [12], prior to running the above procedure.

Next, denote the homography by $H = [h_1 \ h_2 \ h_3]$. From (2), $$[h_1 \ h_2 \ h_3] = \lambda A [r_1 \ r_2 \ t].$$

where $\lambda$ is an arbitrary scalar. Using the knowledge that $r_1$ and $r_2$ are orthonormal, $$h_1^T A^{-T} A^{-1} h_2 = 0 \quad (3)$$

$$h_1^T A^{-T} A^{-1} h_1 = h_2^T A^{-T} A^{-1} h_2. \quad (4)$$

These are the two basic constraints on the intrinsic parameters, given one homography. Because a homography has 8 degrees of freedom and there are 6 extrinsic parameters (3 for rotation and 3 for translation), it is only possible to obtain 2 constraints on the intrinsic parameters. Note that $A^{-T} A^{-1}$ actually describes the image of the absolute conic [16]. The next subsection provides a geometric interpretation of this circumstance.

1.4 Geometric Interpretation

When relating Equations (3) and (4) to the absolute conic, it is not difficult to verify that the model plane is described in the camera coordinate system by the following equation:

$$\begin{bmatrix} r_3 \\ r_3^T t \end{bmatrix}^T \begin{bmatrix} x \\ y \\ z \\ w \end{bmatrix} = 0;$$

where w=0 for points at infinity and w=1 otherwise. This plane intersects the plane at infinity at a line, and it can be easily see that $$\begin{bmatrix} r_1 \\ 0 \end{bmatrix} \text{ and } \begin{bmatrix} r_2 \\ 0 \end{bmatrix}$$

are two particular points on that line. Any point on it is a linear combination of these two points, i.e., $$x_\infty = a \begin{bmatrix} r_1 \\ 0 \end{bmatrix} + b \begin{bmatrix} r_2 \\ 0 \end{bmatrix} = \begin{bmatrix} ar_1 + br_2 \\ 0 \end{bmatrix}.$$

Now, compute the intersection of the above line with the absolute conic. By definition, the point $x_\infty$, known as the circular point, satisfies: $x_\infty^T x_\infty = 0$, i.e., $$(ar_1 + br_2)^T (ar_1 + br_2) = 0, \text{ or } a^2 + b^2 = 0.$$

The solution is $b = \pm ai$, where $i^2 = -1$. That is, the two intersection points are $$x_\infty = a \begin{bmatrix} r_1 \pm i r_2 \\ 0 \end{bmatrix}.$$

Their projection in the image plane is then given, up to a scale factor, by $$\tilde{m}_{\infty} = A(r_1 \pm i r_2) = h_1 \pm i h_2.$$

Point $\tilde{m}_\infty$ is on the image of the absolute conic, described by $A^{-T} A^{-1}$ [16]. This gives $$(h_1 \pm i h_2)^T A^{-T} A^{-1} (h_1 \pm i h_2) = 0.$$

Requiring that both real and imaginary parts be zero yields Equations (3) and (4).

2. Solving Camera Calibration

Figure 2:
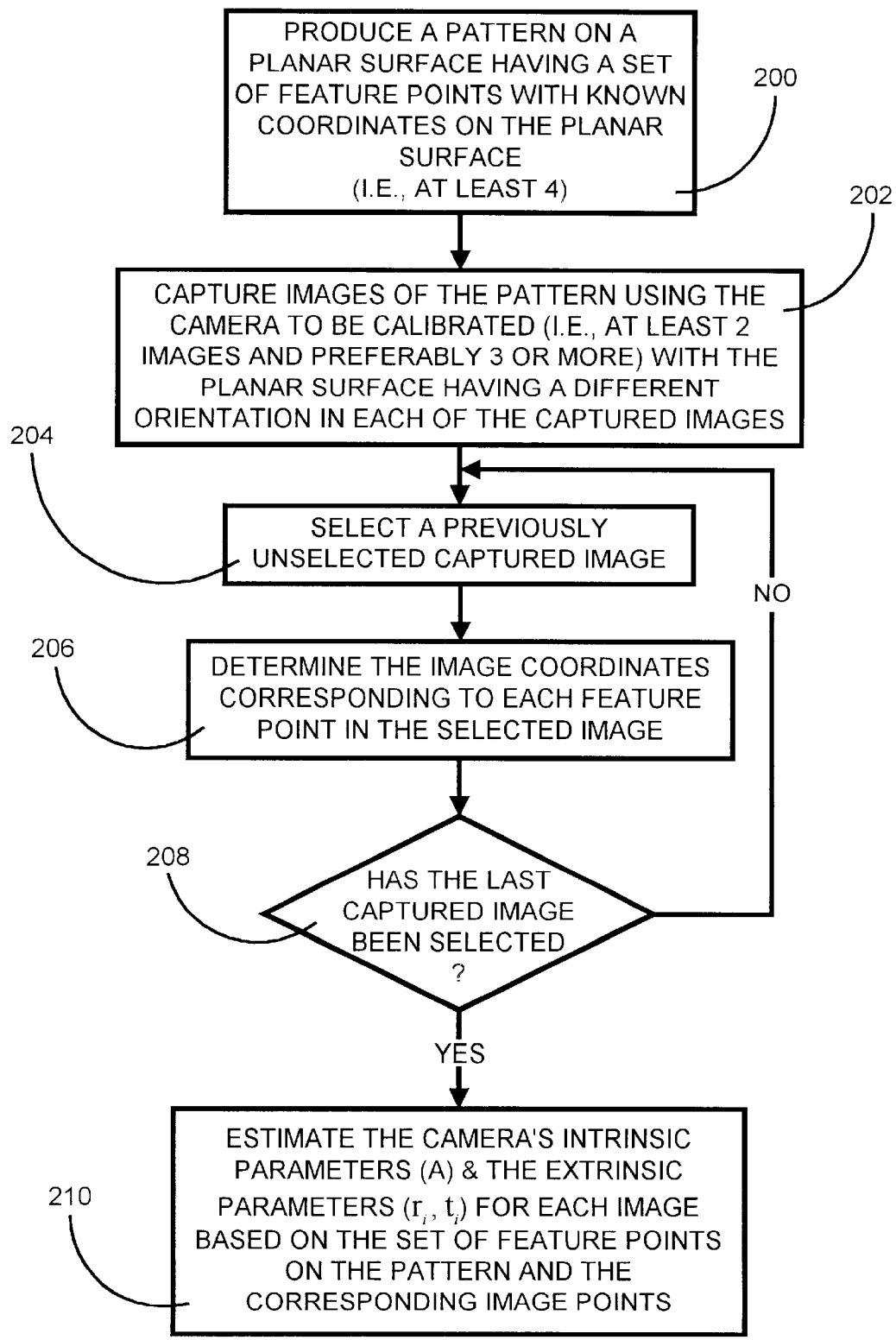
FIG. 2 is a block diagram of an overall process according to the present invention for using multiple images of a pattern placed on a planar surface to estimate a digital camera's intrinsic parameters and the extrinsic parameters associated with a set of images.

This section provides the details of how to effectively solve the camera calibration problem. In general, the camera calibration problem is solved by computing estimates of the camera's intrinsic parameters (A) and the extrinsic parameters (R, t) associated with each image of the aforementioned pattern. This is accomplished based on the high-level process depicted in FIG. 2. In step 200 of the process, a pattern is produced on a planar surface. This pattern is characterized by at least four, and preferably many (e.g., 120), feature points having known coordinates on the planar surface. Images of the pattern are captured using the camera which is to be calibrated (step 202). At least two images should be taken, however as will be explained later, 3 or more images are preferred. In addition, the orientation of the pattern should be different in each of the images, as will also be explained later. The different orientations of the pattern in space can be obtained by either moving the planar surface in relation to the camera, or by moving the camera in relation to the planar surface. It is irrelevant which method is used. Next, in steps 204 through 208, the coordinates of the aforementioned feature points as they appear in each image are ascertained via conventional means. These coordinates will be referred to as image coordinates in the discussion to follow. Finally, in step 210, the camera's intrinsic parameters (A), and the extrinsic parameters (R, t) associated with each image, are estimated in general by using the known coordinates of the feature points on the planar surface and the observed images coordinates of these points in the captured images. The parameter estimation process (step 210) can involve the use of a closed-form analytical solution (Section 2.1), which may be followed by a nonlinear optimization technique based on the maximum likelihood criterion (Section 2.2.). Alternately, the optimization technique could be used directly. In addition, lens distortion can be taken into account to refine both the analytical and nonlinear solutions (Section 2.3). It is even possible to employ a modified nonlinear optimization technique that inherently accounts for lens distortion (Section 2.4).

2.1 Closed-Form Solution

Let Equation (5) be:

$$B = A^{-T}A^{-1} = \begin{bmatrix} B_{11} & B_{12} & B_{13} \\ B_{12} & B_{22} & B_{23} \\ B_{13} & B_{23} & B_{33} \end{bmatrix}$$

$$= \begin{bmatrix} \frac{1}{\alpha^2} & -\frac{\gamma}{\alpha^2\beta} & \frac{v_0\gamma - u_0\beta}{\alpha^2\beta} \\ -\frac{\gamma}{\alpha^2\beta} & \frac{\gamma^2}{\alpha^2\beta^2} + \frac{1}{\beta^2} & -\frac{\gamma(v_0\gamma - u_0\beta)}{\alpha^2\beta^2} - \frac{v_0}{\beta^2} \\ \frac{v_0\gamma - u_0\beta}{\alpha^2\beta} & -\frac{\gamma(v_0\gamma - u_0\beta)}{\alpha^2\beta^2} - \frac{v_0}{\beta^2} & \frac{(v_0\gamma - u_0\beta)^2}{\alpha^2\beta^2} + \frac{v_0^2}{\beta^2} + 1 \end{bmatrix}.$$

Note that B is symmetric, defined by a 6D vector $$b=[B_{11}, B_{12}, B_{22}, B_{13}, B_{23}, B_{33}]^T. \qquad (6)$$

Additionally, let the $i^{th}$ column vector of H be $h_i=[h_{i1}, h_{i2}, h_{i3}]^T$. Then, $$h_i^T B h_j = v_{ij}^T b \qquad (7)$$

with $$v_{ij}=[h_{i1}h_{j1}, h_{i1}h_{j2}+h_{i2}h_{j1}, h_{i2}h_{j2},$$
$$h_{i3}h_{j1}+h_{i1}h_{j3}, h_{i3}h_{j2}+h_{i2}h_{j3}, h_{i3}h_{j3}]^T.$$

Therefore, the two fundamental constraints of Equations (3) and (4), from a given homography, can be rewritten as 2 homogeneous equations in b:

$$\begin{bmatrix} v_{12}^T \\ (v_{11} - v_{22})^T \end{bmatrix} b = 0. \qquad (8)$$

If n images of the model plane are observed, by stacking n such equations as (8), the following equation is formed:

$$Vb=0 \qquad (9)$$

where V is a 2n×6 matrix. If n≥3, there is, in general, a unique solution b defined up to a scale factor. If n=2, it is possible to impose the skewless constraint γ=0, i.e., [0, 1, 0, 0, 0, 0]b=0, which is added as an additional equation to (9). The solution to Equation (9) is well known as the eigenvector of $V^T V$ associated with the smallest eigenvalue (equivalently, the right singular vector of V associated with the smallest singular value).

Once b is estimated, it is possible to compute the camera intrinsic matrix A. The matrix B is estimated up to a scale factor, i.e., $B=\lambda A^{-T} A$ with λ an arbitrary scale. Without difficulty, the intrinsic parameters from matrix B can be uniquely extracted as follows:

$$v_0=(B_{12}B_{13}-B_{11}B_{23})/(B_{11}B_{22}-B_{12}^2)$$

$$\lambda=B_{33}-[B_{13}^2+v_0(B_{12}B_{13}-B_{11}B_{23})]/B_{11}$$

$$\alpha=\sqrt{\lambda/B_{11}}$$

$$\beta=\sqrt{\lambda B_{11}/(B_{11}B_{22}-B_{12}^2)}$$

$$\gamma=-B_{12}\alpha^2\beta/\lambda$$

$$u_0=\gamma v_0/\alpha-B_{13}\alpha^2/\lambda$$

Once A is known, the extrinsic parameters for each image are readily computed.

From (2), $$r_1=\lambda A^{-1}h_1$$

$$r_2=\lambda A^{-1}h_2$$

$$r_3=r_1 \times r_2$$

$$t=\lambda A^{-1}h_3$$

with $$\lambda=1/\|A^{-1}h_1\|=1/\|A^{-1}h_2\|.$$

Of course, because of noise in the data, the so-computed matrix $R=[r_1, r_2, r_3]$ may not in general satisfy the properties of a rotation matrix. A method to estimate the best rotation matrix from a general 3×3 matrix is as follows. The problem considered is to solve for the best rotation matrix R to approximate a given 3×3 matrix Q. Here, "best" is in the sense of the smallest Frobenius norm of the difference R−Q. That is, the following problem needs to be solved:

$$\min_R \|R - Q\|_F^2 \text{ subject to } R^T R = I.$$

Since $$\|R - Q\|_F^2 = \text{trace}((R - Q)^T (R - Q))$$
$$= 3 + \text{trace}(Q^T Q) - 2\text{trace}(R^T Q),$$

The aforementioned problem is equivalent to the one of maximizing trace ($R^T Q$).

Let the singular value decomposition of Q be $USV^T$, where $S=\text{diag}(\sigma_1, \sigma_2, \sigma_3)$. If an orthogonal matrix Z by $Z=V^T R^T U$ is defined, then $$\text{trace}(R^T Q) = \text{trace}(R^T USV^T) = \text{trace}(V^T R^T US)$$

$$= \text{trace}(ZS) = \sum_{i=1}^{3} z_{ii}\sigma_i \leq \sum_{i=1}^{3} \sigma_i.$$

It is clear that the maximum is achieved by setting $R=UV^T$ because then $Z=I$. This gives the solution to the aforementioned problem.

Figure 3:
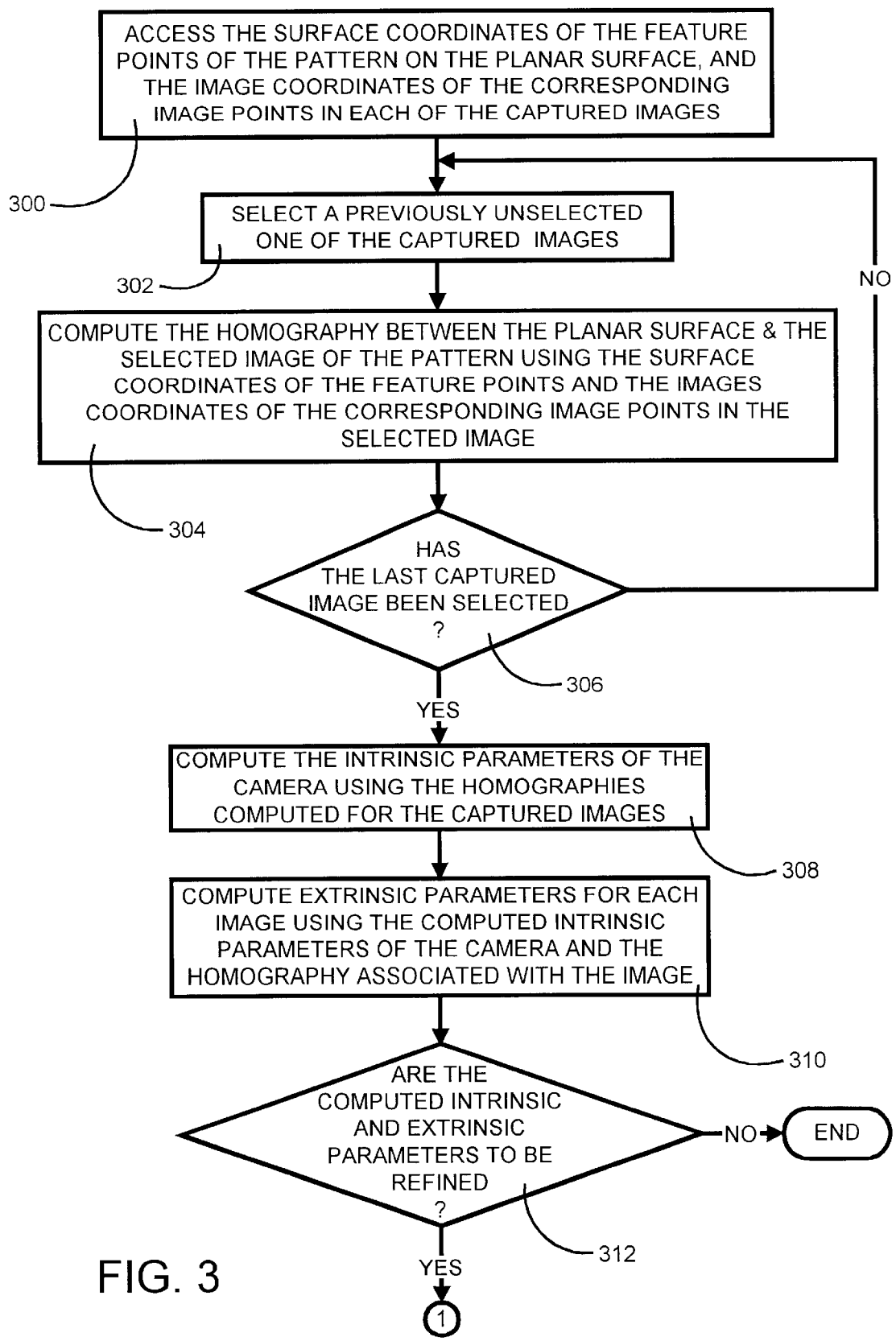
FIG. 3 is a block diagram of a process for accomplishing the estimation program modules of the overall process of FIG. 2 employing an analytical closed form solution approach.

In view of the above, the following process is preferably employed to obtain an estimate of the camera's intrinsic parameters and the extrinsic parameters associated with each of the captured images. Referring to FIG. 3, the first step 300 involves accessing the previously obtained surface coordinates of the feature points of the pattern on the planar surface, as well as the image coordinates of the corresponding image points in each of the captured images. One of the images is then selected (step 302) and the homography between the planar surface and the selected image is computed using the surface coordinates of the feature points and the image coordinates of the corresponding image points (step 304). This process is then repeated for all the captured images (step 306). Next, in step 308, an estimate of the intrinsic parameters of the camera is computed using the homographies of all the captured images. The extrinsic parameters of each image can then be respectively computed from the intrinsic parameters and the homography associated with the respective image (step 310).

2.2 Maximum Likelihood Estimation

As shown in step 312 of FIG. 3, the estimation process ends if no refinement of the estimates for the intrinsic and extrinsic parameters is required. However, the closed-form solution is obtained through minimizing an algebraic distance which may not be as physically accurate as desired for the particular application requiring the estimate. In such a case, the closed-form estimate of the intrinsic and extrinsic parameters can be refined through a maximum likelihood inference approach.

Given n images of a planar pattern and m feature points on the pattern, assume that the image points are corrupted by independent and identically distributed noise. The maximum likelihood estimate can be obtained by minimizing the following functional:

$$\sum_{i=1}^{n} \sum_{j=1}^{m} \|m_{ij} - \hat{m}(A, R_i, t_i, M_j)\|^2, \quad (10)$$

where $\hat{m}(A, R_i, t_i, M_j)$ is the projection of point $M_j$ in image i, according to equation (2). Rotation R is parameterized by a 3D vector $r=\theta u$ where $\theta$ is the rotation angle and u is the unit rotation axis. This is a nonlinear minimization problem, which can be solved with the Levenberg-Marquardt Algorithm as implemented in Minpack [18]. It requires an initial guess of A, $\{R_i, t_i|=1 \ldots\}$ which can be obtained using the technique described in the previous subsection.

Figure 4A:
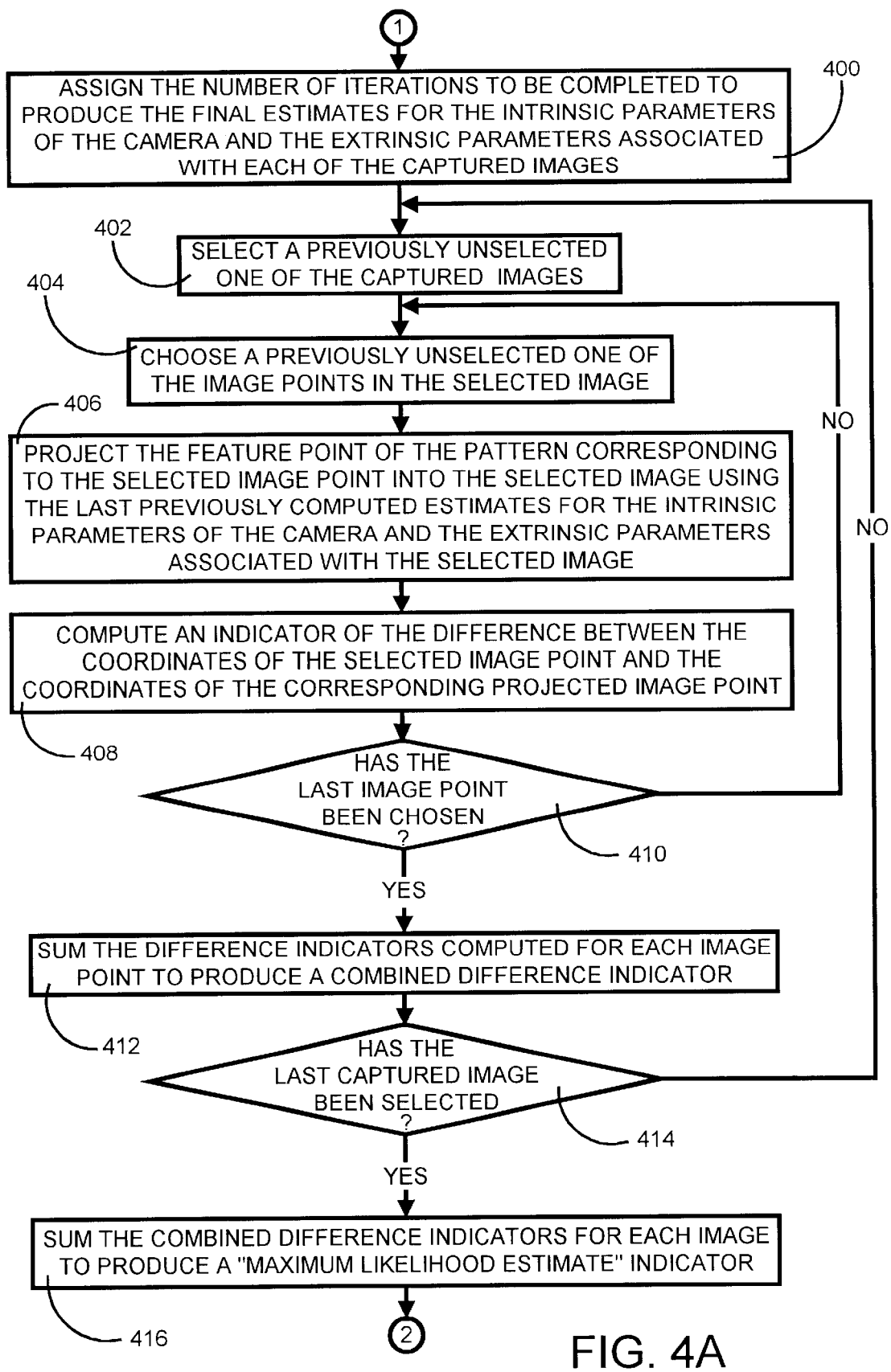
FIGS. 4A through 4C are block diagrams of a process for accomplishing the estimation program modules of the overall process of FIG. 2 employing a maximum likelihood estimation approach.
Figure 4B:
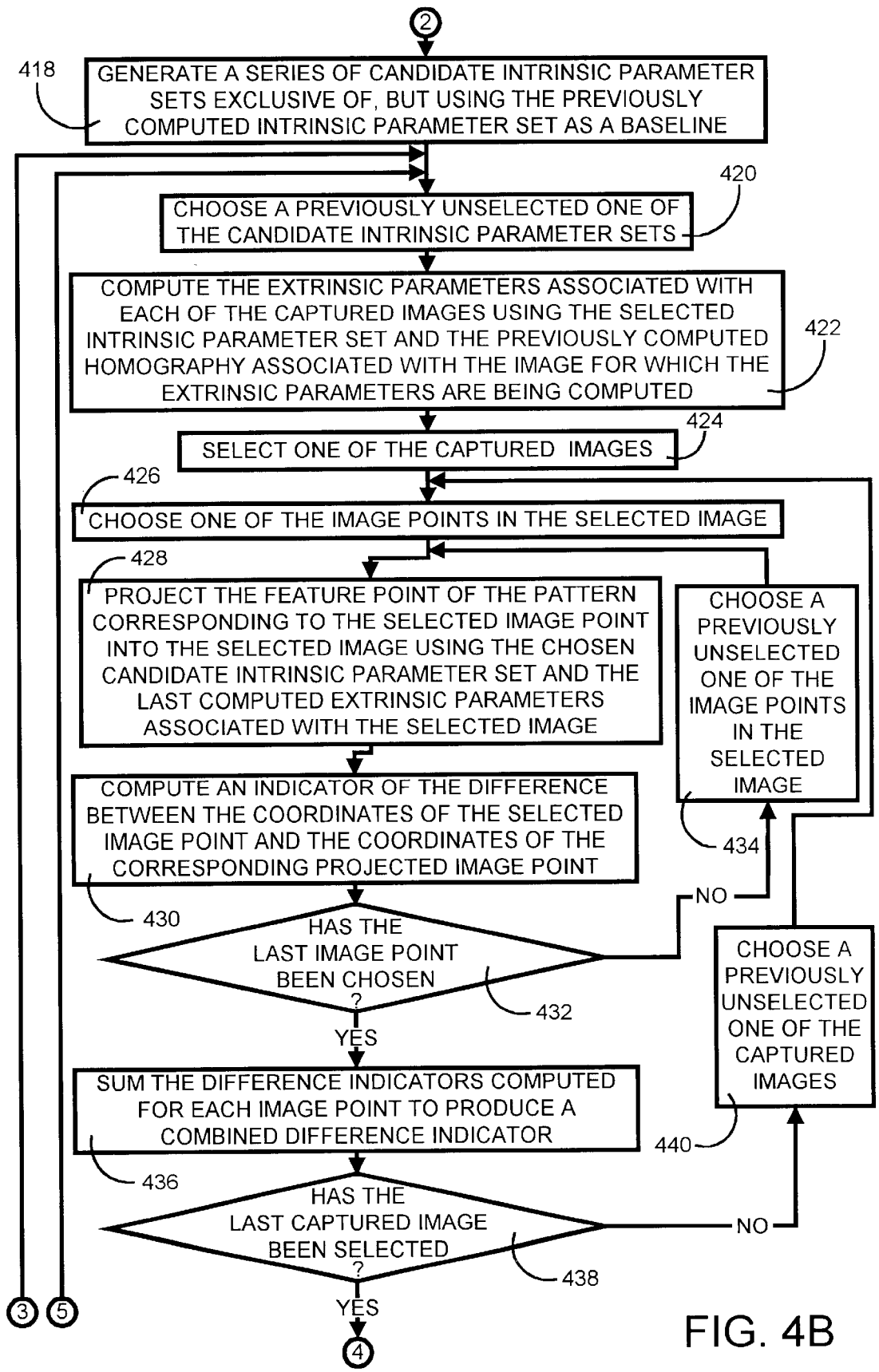
Figure 4C:
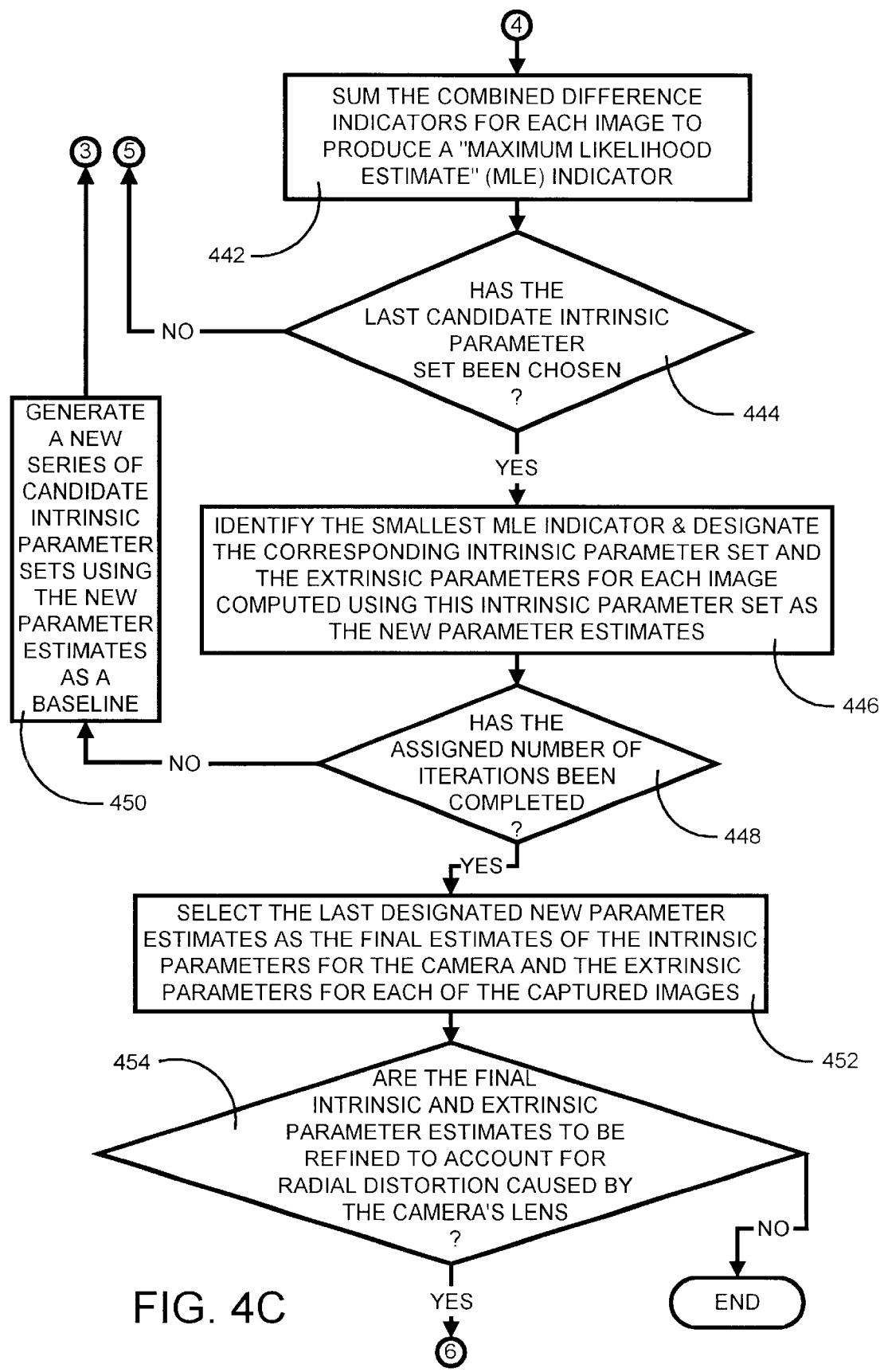

A preferred process of implementing the foregoing approach is shown in FIGS. 4A through 4C. The first step 400 of this process is to assign the number of iterations that are to be completed before the estimates of the intrinsic parameters of the camera and the extrinsic parameters associated with the captured images are considered final. In tested embodiments of the present invention it was found that 3 to 5 iterations were required for convergence. The first iteration begins by selecting one of the captured images (step 402) and choosing one of the image points in the selected image (step 404). The feature point of the pattern corresponding to the chosen image point is projected into the selected image using the previously computed estimates of the intrinsic parameters of the camera and the extrinsic parameters associated with the selected image (step 406). It is noted that while the use of the previous computed estimates of the parameters derived from the closed-form solution approach is preferred, an alternate method is possible. In this alternate method, the closed-form solution approach is not employed, rather the present MLE approach is used directly, with the initial estimates of the intrinsic and extrinsic parameters being guessed or set to some reasonable arbitrary values.

In the next step 408 of the process, an indicator of the difference between the image coordinates of the selected image point and the image coordinates of the corresponding projected image point is computed. The indicator is preferably a measure of how far apart the observed and the projected image points are from each other. The last two steps (i.e., steps 406 and 408) are then repeated for all the image points in the selected images (step 410). The difference indicators computed for each image are summed to produce a combined difference indicator in step 412. Combined difference indicators are then computed for all the other captured images by repeating steps 402 through 412, as indicated in step 414. Once all the combined indicator are computed, they are summed in step 416 to produce a "Maximum Likelihood Estimate" (MLE) indicator.

In the next phase of the process, a series of candidate intrinsic parameter sets are generated (step 418) via conventional methods, such as the aforementioned Levenberg-Marquardt Algorithm. These candidate sets are different from the previously estimated parameters, but typically employ the previous estimate as a baseline. One of the candidate intrinsic parameter sets is chosen in step 420, and the extrinsic parameters associated with each of the captured images are computed using the selected intrinsic parameter set and the previously computed homography associated with the images for which the extrinsic parameters are being computed (step 422). Note that if the alternate procedure of foregoing the closed-form solution approach and calculating the parameters directly with the MLE method is employed, the homographies for each image will still have to be computed. This can be done as described in Section 2.1.

The process continues with one of the capture images being selected (step 424) and one of the images point in the selected image being chosen (step 426). The feature point corresponding to the chosen image point is projected into the selected image using the chosen candidate intrinsic parameter set and the last computed extrinsic parameters associated with the selected image (step 428). As before, an indicator of the difference between the coordinates of the chosen image point and that of the corresponding projected image point is computed (step 430). This process is once again repeated for each image point in the selected image as indicated in steps 432 and 434. The difference indicators associated with the image points are then summed to produce another of the combined difference indicators (step 436). The foregoing process of steps 426 through 436 are repeated for each of the captured images (steps 438 and 440), then all the combined difference indicators produced thereby are summed to produce another MLE indicator. Similarly, the part of the process described by steps 420 through 442 is repeated for each candidate intrinsic parameter set as indicated by step 444. Once all the MLE indicators associated with both the initial estimate of the intrinsic parameters and all the candidate parameter sets have been produced, the smallest of them is identified in step 446. The intrinsic parameters and the associated extrinsic parameters of each of the capture images that correspond to the smallest MLE indicator are designated as the new parameter estimates.

If the desired number of iterations is more than one, then the entire MLE process (i.e., steps 420 through 446) is repeated using the last designated new parameter estimates as a baseline for generating a new series of candidate intrinsic parameter sets, until the desired number of iterations has been completed (steps 448 and 450). Once all the iterations are complete the last designated new parameter estimates are selected as the final estimates of the intrinsic parameters of the camera and the extrinsic parameters for each of the captured images (step 452).

2.3 Dealing with Radial Distortion

Up to now, lens distortion of the camera has not been considered. However, a desktop camera usually exhibits significant lens distortion, especially radial distortion. In this section, only the first two terms of radial distortion are considered. The reader is referred to [20, 2, 4, 26] for more elaborated models. Based on the reports in the literature [2, 23, 25], it is likely that the distortion function is totally dominated by the radial components, and especially dominated by the first term. It has also been found that any more elaborated modeling not only would not help (negligible when compared with sensor quantization), but also would cause numerical instability [23, 25].

Let (u, v) be the ideal (nonobservable distortion-free) pixel image coordinates, and $(\breve{u},\breve{v})$ the corresponding real observed image coordinates. The ideal points are the projection of the model points according to the pinhole model. Similarly, (x, y) and $(\breve{x},\breve{y})$ are the ideal (distortion-free) and real (distorted) normalized image coordinates. Thus, the following relationship exists $$\breve{x}=x+x[k_1(x^2+y^2)+k_2(x^2+y^2)^2]$$

$$\breve{y}=y+y[k_1(x^2+y^2)+k_2(x^2+y^2)^2],$$

where $k_1$ and $k_2$ are the coefficients of the radial distortion [2, 25]. The center of the radial distortion is the same as the principal point. From $$\breve{u}=u_0+\alpha\breve{x}+c\breve{y} \text{ and } \breve{v}=v_0+\beta\breve{y}$$

follows $$\breve{u}=u+(u-u_0)[k_1(x^2+y^2)+k_2(x^2+y^2)^2] \quad (11)$$

$$\breve{v}=v+(v-v_0)[k_1(x^2+y^2)+k_2(x^2+y^2)^2]. \quad (12)$$

2.3.1 Estimating Radial Distortion by Alternation

As the radial distortion is expected to be small, one would expect to estimate the other five intrinsic parameters, using the technique described in Section 2.1 or 2.2, reasonable well by simply ignoring distortion. One strategy is then to estimate $k_1$ and $k_2$ after having estimated the other parameters, which will give us the ideal pixel coordinates (u, v). Then, from Equations (11) and (12), there are two equations for each point in each image:

$$\begin{bmatrix} (u-u_0)(x^2+y^2) & (u-u_0)(x^2+y^2)^2 \\ (v-v_0)(x^2+y^2) & (v-v_0)(x^2+y^2)^2 \end{bmatrix} \begin{bmatrix} k_1 \\ k_2 \end{bmatrix} = \begin{bmatrix} \breve{u}-u \\ \breve{v}-v \end{bmatrix}.$$

Given m points in n images, all the equations can be stacked together to obtain in total 2 mn equations, or in matrix form as Dk=d, where $k=[k_1, k_2]^T$. The linear least-squares solution is given by $$k=(D^TD)^{-1}D^Td \quad (13)$$

Once $k_1$ and $k_2$ are estimated, one can refine the estimate of the other parameters (see step 454 of FIG. 4C) by solving Equation (10) with m̂ (A, $R_i$, $t_i$, $M_j$) replaced by Equations (11) and (12). These two procedures can be alternated until convergence.

Figure 5A:
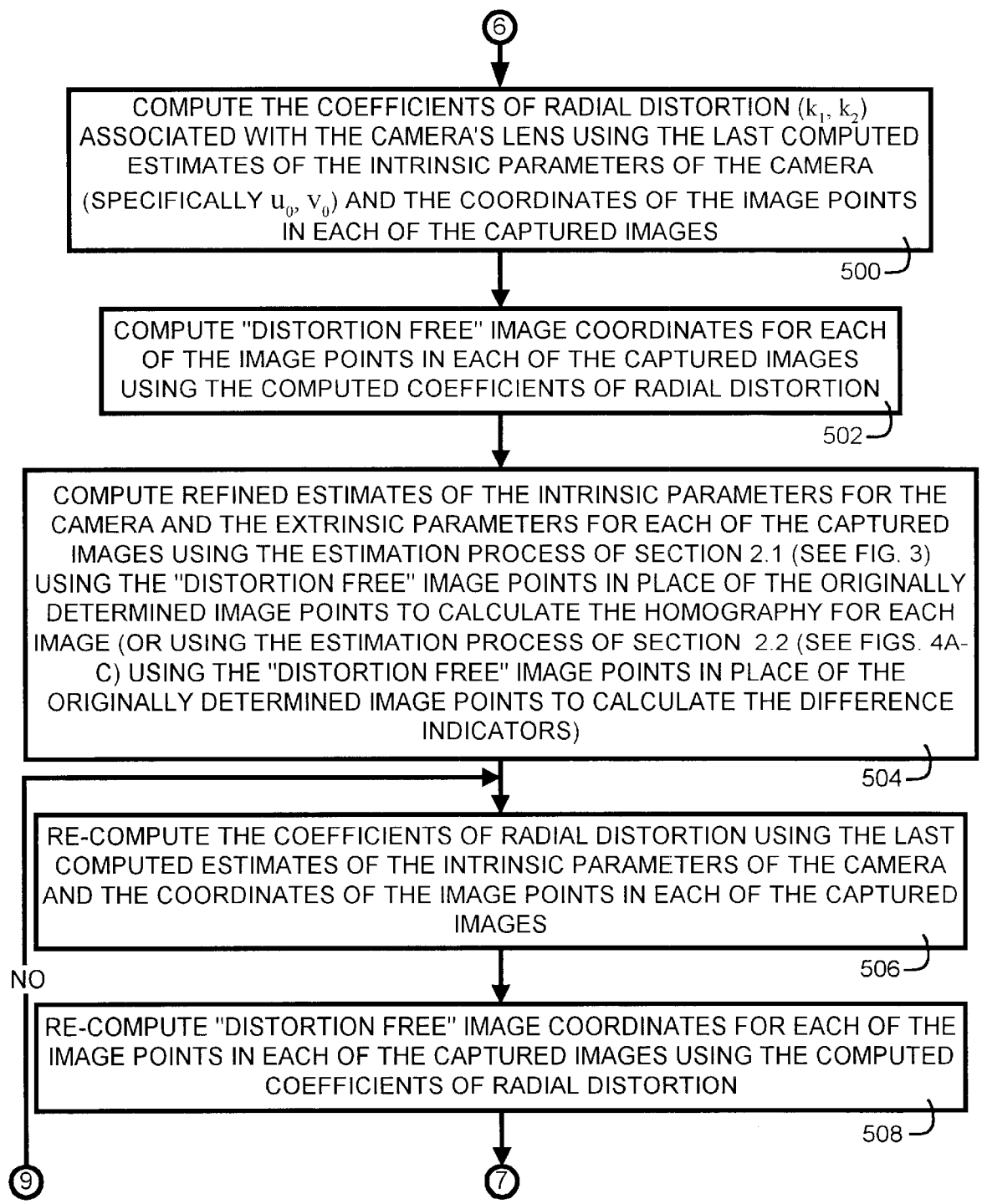
FIGS. 5A and 5B are block diagrams of a process for accounting for radial distortion cause by the lens of the camera in the estimation processes of either FIG. 3, or FIGS. 4A trough 4C.
Figure 5B:
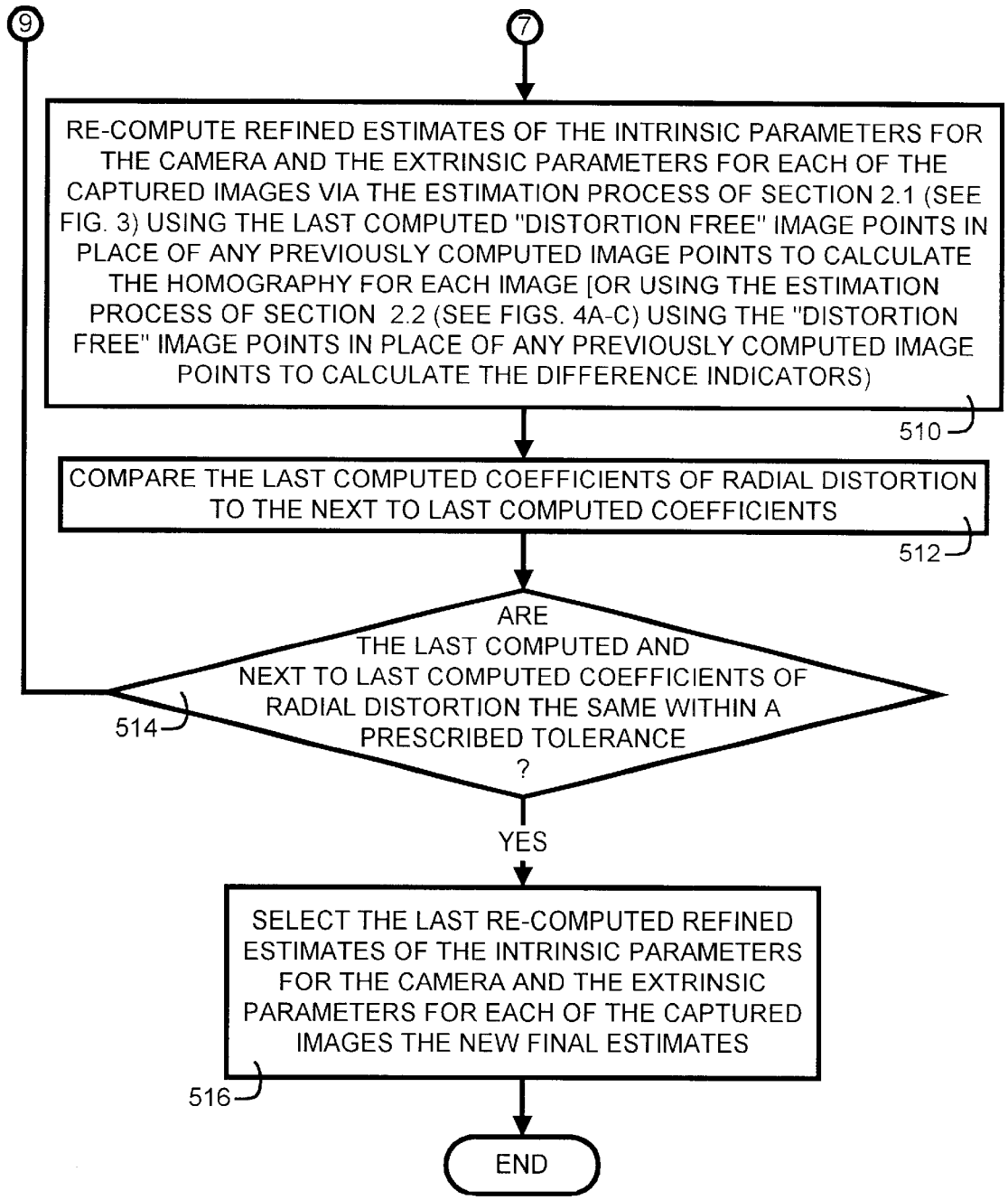

The preferred process steps for accomplishing the aforementioned refinement are provided in FIGS. 5A and 5B. In step 500, the coefficients of radial distortion ($k_1$, $k_2$) associated with the camera's lens are computed using the last computed estimates of the camera's intrinsic parameters (specifically $u_0$ and $v_0$) and the image coordinates of the image points in each of the captured images. Next, in step 502, "distortion free" image coordinates for each of the image points in each of the captured images are computed using the coefficients of radial distortion. The "distortion free" image coordinates are then used in step 504 to replace of the originally observed image points when calculating the homography for each captured image in conjunction with the estimating of the camera's intrinsic parameters and the extrinsic parameters of the images in the closed-form estimation process of Section 2.1 (see FIG. 3). Alternately, the "distortion free" image coordinates can be used in step 504 to replace of the originally observed image points when calculating the difference indicators in conjunction with the estimating of the camera's intrinsic parameters and the extrinsic parameters of the images in the MLE estimation process of Section 2.2 (see FIGS. 4A–C). Regardless of which estimation approach is used to refine the intrinsic and extrinsic parameter estimates, in step 506, the coefficients of radial distortion are re-computed as described above using the refined estimates. The "distortion free" image points are then re-computed in step 508 using the refined estimates of the coefficients of radial distortion. The now refined estimates of the "distortion free" image point are next used to obtain further refined estimates of the intrinsic and extrinsic parameters using either of the aforementioned estimation processes (step 510). The last computed coefficients of radial distortion are compared to the coefficients computed next to last in step 512. Referring to step 514, if the compared coefficients are not the same within a prescribed tolerance, such as $1.0 \times 10^{-8}$, then the foregoing procedure of steps 506 through 512 is repeated until they do match. Whenever, the compared coefficients match within the prescribed tolerance, the last re-computed estimates are then selected in step 516 as the new final estimates.

2.3.2 Complete Maximum Likelihood Estimation

Experimentally, it was found the convergence of the above alternation technique is slow. A natural extension to Equation (10) is to estimate the complete set of parameters by minimizing the following functional:

$$\sum_{i=1}^{n}\sum_{j=1}^{m}\left\|m_{ij}-\breve{m}(A,k_1,k_2,R_i,t_i,M_j)\right\|^2, \quad (14)$$

where $\breve{m}$ $(A, k_1, k_2, R_i, t_i, M_j)$ is the projection of point $M_j$ in image i according to Equation (2), followed by distortion according to Equations (11) and (12). This is a nonlinear minimization problem, which can be solved with the Levenberg-Marquardt Algorithm as implemented in Minpack [18]. An initial guess of A and $\{R_i, t_i | i=1 \ldots n\}$ can be obtained using the technique described in Section 2.1 or in Section 2.2. An initial guess of $k_1$ and $k_2$ can be obtained with the technique described in the last paragraph, or simply by setting them to 0.

Figure 6A:
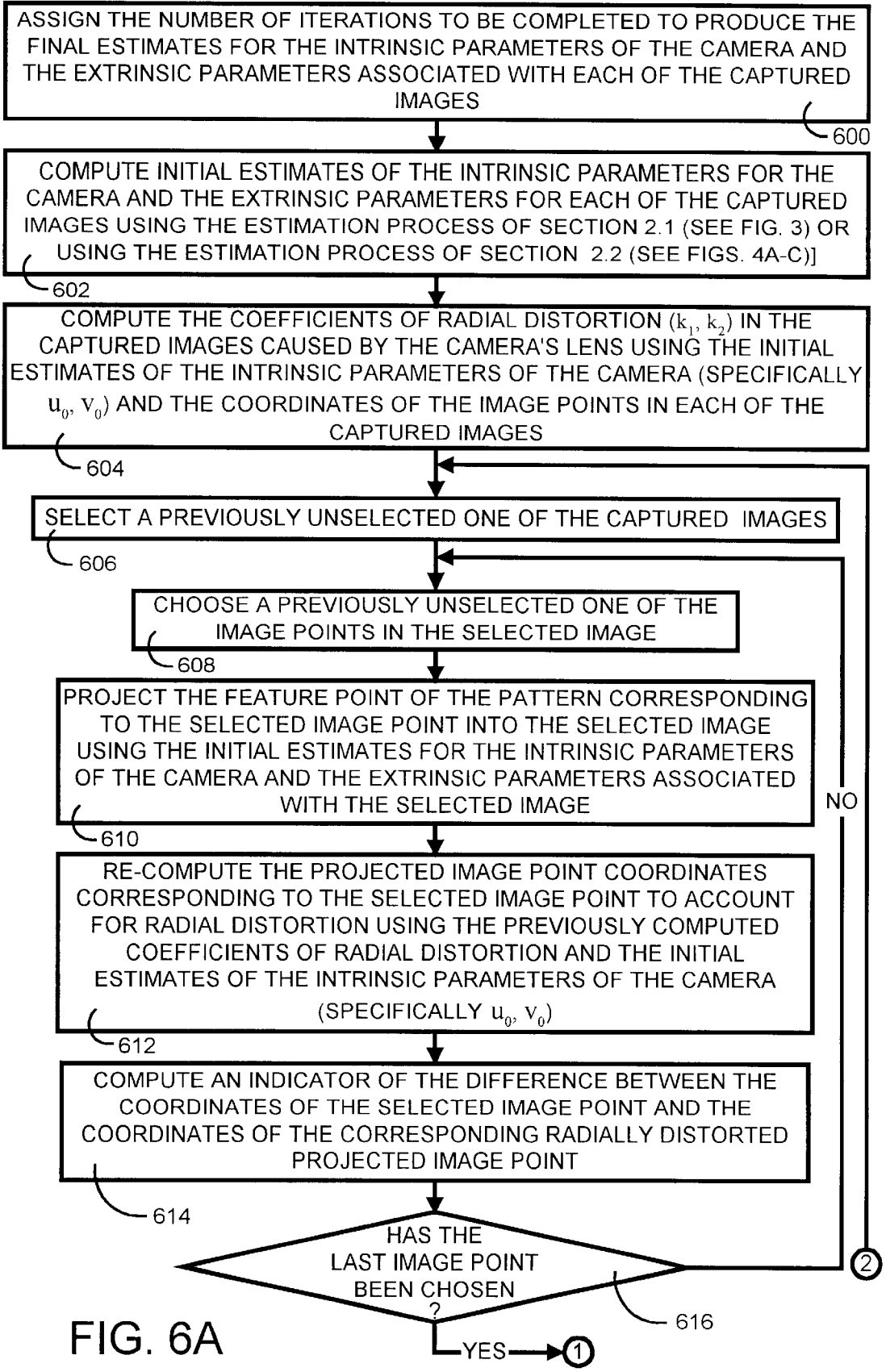
FIGS. 6A through 6D are block diagrams of a process for accomplishing the estimation program modules of the overall process of FIG. 2 employing a more complete maximum likelihood estimation approach that inherently compensates for radial distortion caused by the camera's lens.
Figure 6B:
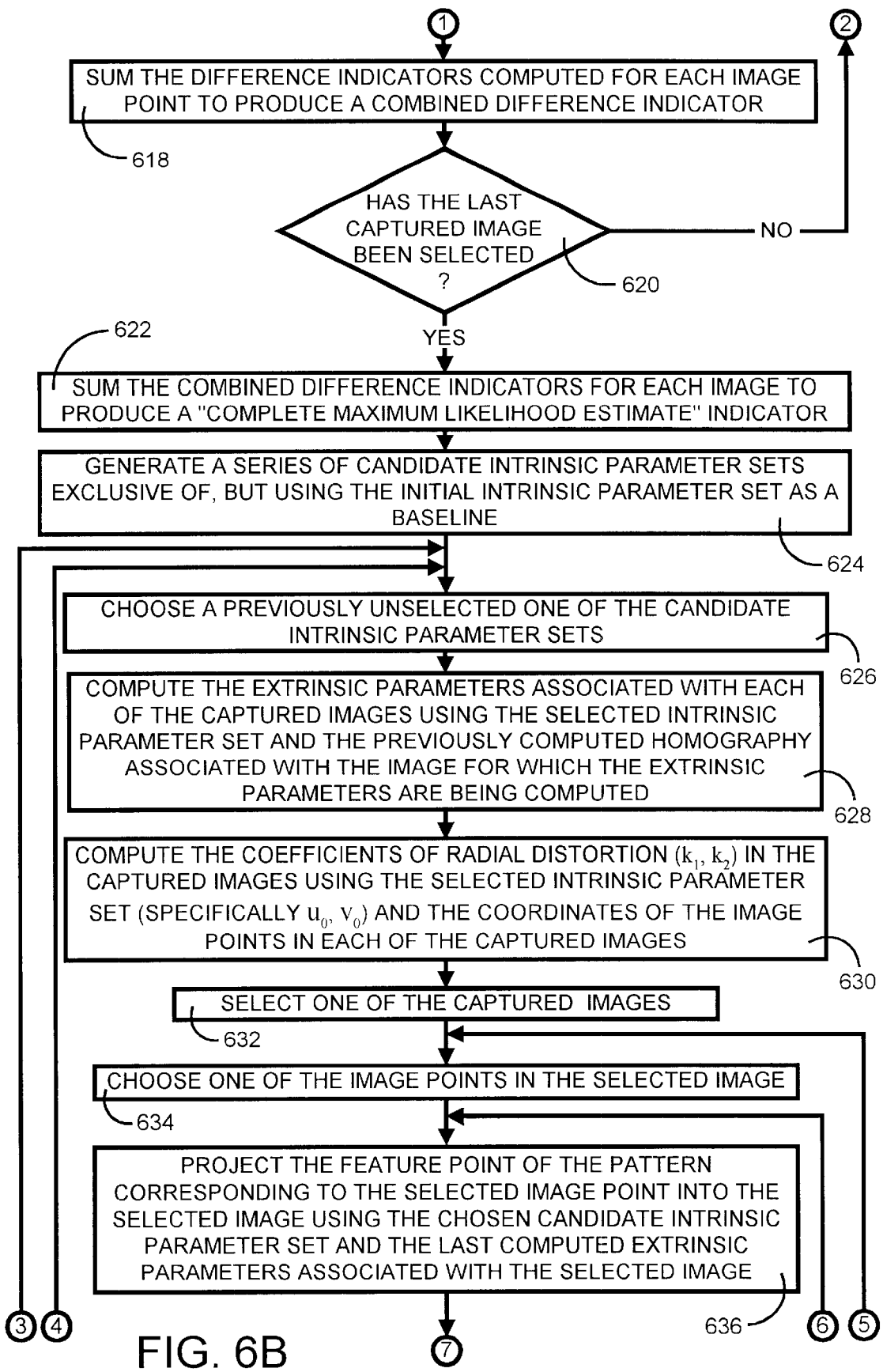
Figure 6C:
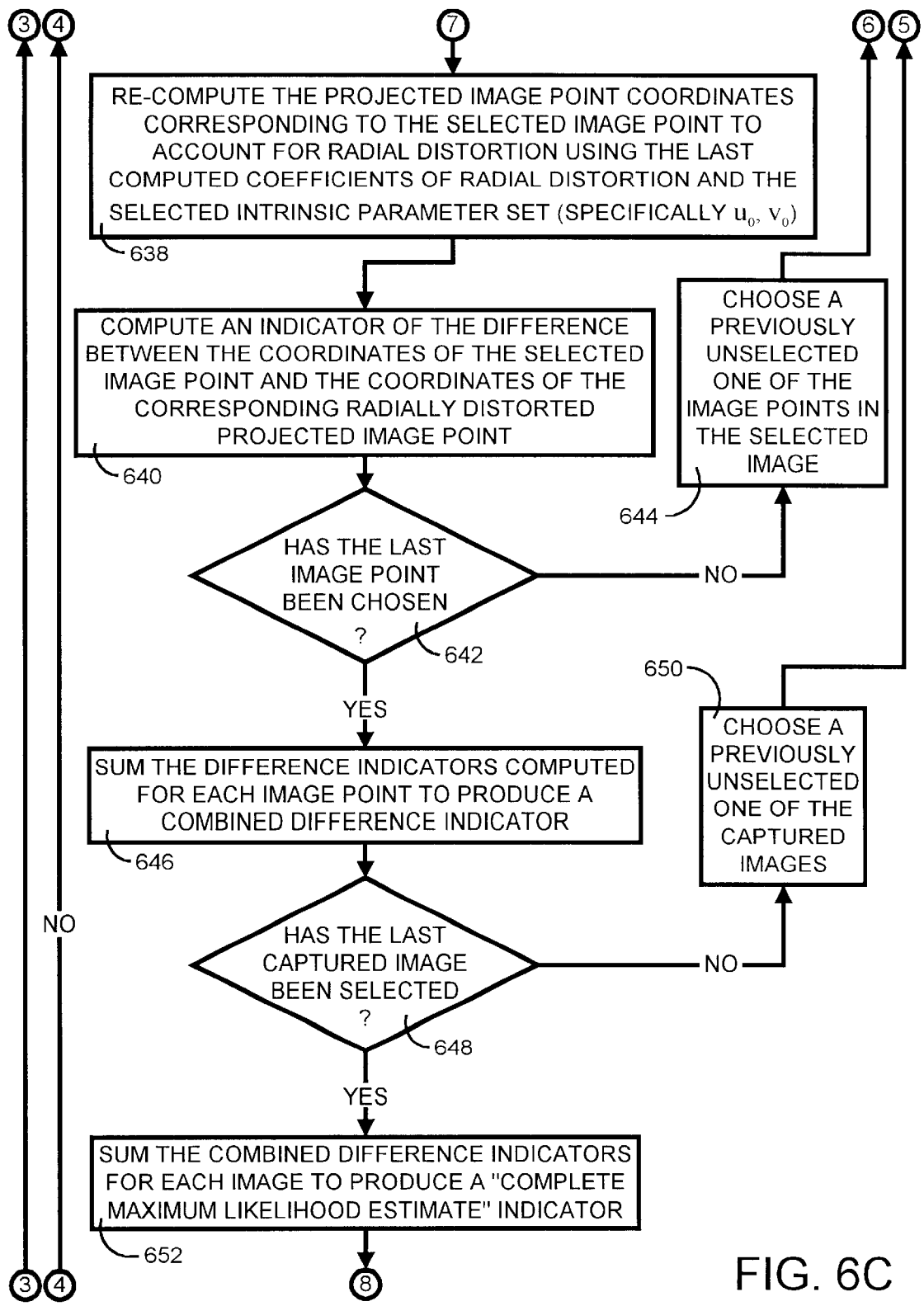
Figure 6D:
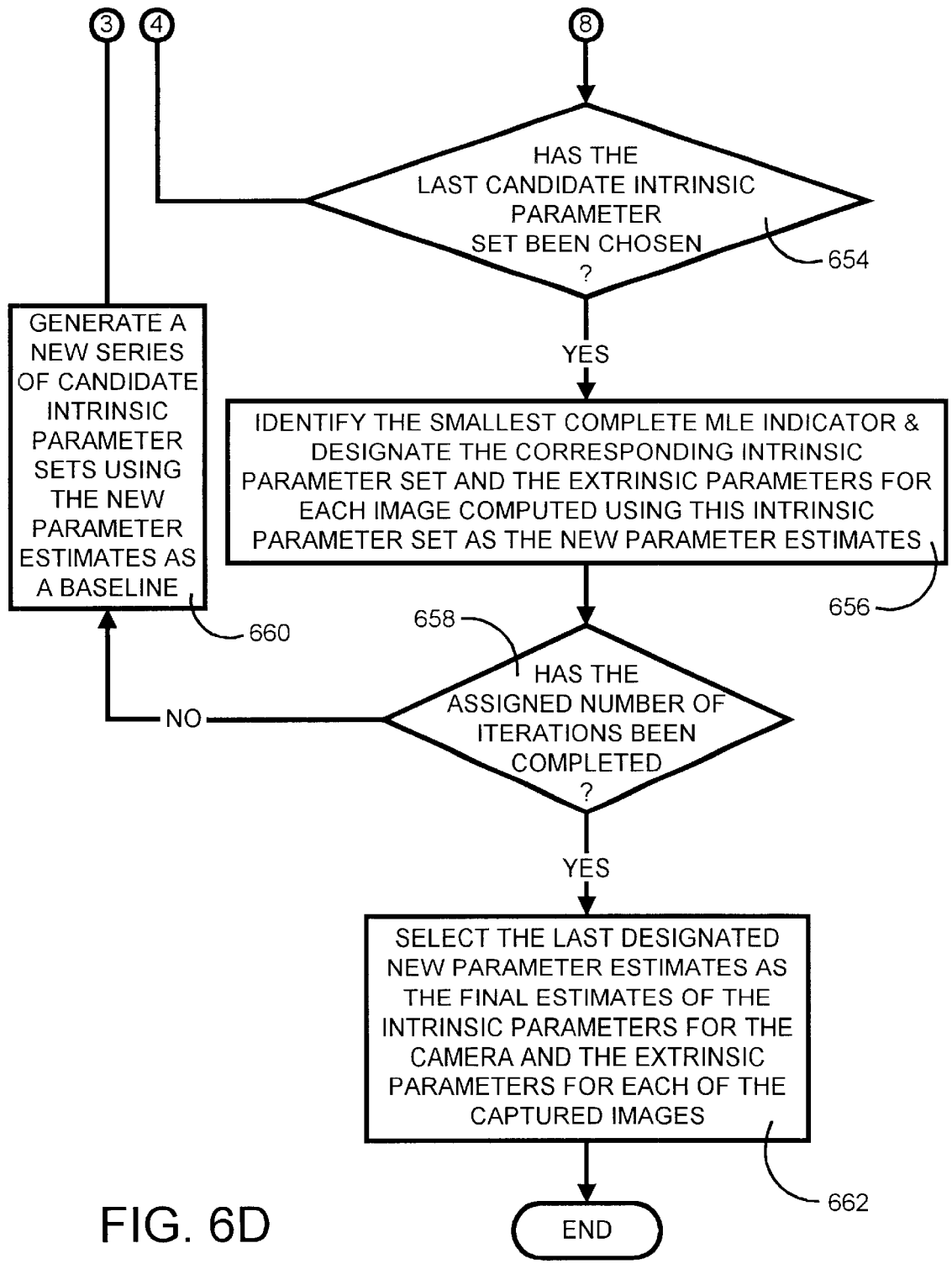

The preferred steps for accomplishing the "complete MLE" process are provided in FIGS. 6A and 6D. Not surprisingly, this version of the estimation process has many of the same steps as the previously-described MLE process with some important additions that will now be explained. The first step 600 of this process (as with the shorter MLE process) is to assign the number of iterations that are to be completed before the estimates of the intrinsic parameters of the camera and the extrinsic parameters associated with the captured images are finalized. In tested embodiments of the present invention it was found that 3 to 5 iterations were required for convergence. The next step 602 of the process is to compute initializing estimates for the intrinsic and extrinsic parameters using either the closed-form estimation process of Section 2.1 (FIG. 3) or the shorter MLE process of Section 2.2 (FIGS. 4A–C). Once the parameters have been estimated, the coefficients of radial distortion are computed using the initial estimates of the intrinsic and extrinsic parameters and the coordinates of the image points of each of the captured images (step 604). Alternately, it can be initially assumed that the coefficients of radial distortion are zero. Next one of the captured images is selected (step 606) and one of the image points in the selected image is chosen (step 608). The feature point of the pattern corresponding to the chosen image point is projected into the selected image using the initializing estimates of the intrinsic parameters of the camera and the extrinsic parameters associated with the selected image (step 610). The coordinates of the projected image point are then re-computed to account for radial distortion in step 612. This is accomplished using the previously computed coefficients of radial distortion and the initial estimates of the intrinsic parameters of the camera (specifically $u_0$ and $v_0$). In the next step 614 of the process, an indicator of the difference between the image coordinates of the selected image point and the image coordinates of the corresponding radially distorted projected image point is computed. The indicator is preferably a measure of how far apart the observed point and the radially distorted projected image point are from each other. Steps 608 through 614 are then repeated for all the image points in the selected image (step 616). The difference indicators computed for each image are summed to produce a combined difference indicator in step 618. Combined difference indicators are then computed for all the other captured images by repeating steps 606 through 618, as indicated by step 620. Once all the combined indicator are computed, they are summed in step 622 to produce a "Complete Maximum Likelihood Estimate" (CMLE) indicator.

In the next phase of the process, a series of candidate intrinsic parameter sets are generated (step 624) via conventional methods, such as the aforementioned Levenberg-Marquardt Algorithm. As before, these candidate sets are different from the previously estimated parameters, but typically employ the previous estimate as a baseline. One of the candidate intrinsic parameter sets is chosen in step 626, and the extrinsic parameters associated with each of the captured images are computed using the selected intrinsic parameter set and the previously computed homography associated with the images for which the extrinsic parameters are being computed (step 628). The process continues with one of the capture images being selected (step 632) and one of the image points in the selected image being chosen (step 634). The feature point corresponding to the chosen image point is projected into the selected image using the chosen candidate intrinsic parameter set and the last computed extrinsic parameters associated with the selected image (step 636). The coordinates of the projected image point are then re-computed to account for radial distortion in step 638 in the manner described previously. In the next step 640 of the process, the aforementioned indicator of the difference between the image coordinates of the selected image point and the image coordinates of the corresponding radially distorted projected image point is computed. Steps 636 through 640 are then repeated for all the image points in the selected image (steps 642 and 644). The difference indicators computed for each image are summed to produce a combined difference indicator in step 646. Combined difference indicators are then computed for all the other captured images by repeating steps 634 through 618, as indicated by steps 648 and 650. Once all the combined indicators are computed, they are summed in step 652 to produce another "Complete Maximum Likelihood Estimate" (CMLE) indicator.

The part of the process described by steps 626 through 652 is repeated for each candidate intrinsic parameter set as indicated by step 654. Once all the CMLE indicators associated with both the initial estimate of the intrinsic parameters and all the candidate parameter sets have been produced, the smallest of them is identified in step 656. The intrinsic parameters and the associated extrinsic parameters of each of the captured images that correspond to the smallest CMLE indicator are designated as the new parameter estimates.

If the desired number of iterations is more than one, then the entire CMLE process (i.e., steps 626 through 656) is repeated, using the last designated new parameter estimates as the baseline for generating a new series of candidate intrinsic parameter sets, until the desired number of iterations has been completed (steps 658 and 660). Once all the iterations are complete the last designated new parameter estimates are selected as the final estimates of the intrinsic parameters of the camera and the extrinsic parameters for each of the captured images (step 662).

3. Degenerate Configurations

This section concerns configurations in which additional images do not provide more constraints on the camera intrinsic parameters. Because Equations (3) and (4) are derived from the properties of the rotation matrix, if $R_2$ is not independent of $R_1$, then image 2 does not provide additional constraints. In particular, if a plane undergoes a pure translation, then $R_2=R_1$ and image 2 is not helpful for camera calibration. In the following, a more complex configuration is considered.

Proposition. If the model plane at the second position is parallel to its first position, then the second homography does not provide additional constraints.

Proof. $R_2$ and $R_1$ are related by a rotation around z-axis. That is, $$R_1 \begin{bmatrix} \cos\theta & -\sin\theta & 0 \\ \sin\theta & \cos\theta & 0 \\ 0 & 0 & 1 \end{bmatrix} = R_2,$$

where $\theta$ is the angle of the relative rotation. The superscript $^{(1)}$ and $^{(2)}$ will be used to denote vectors related to image 1 and 2, respectively. It is clear that $$h_1^{(2)} = \lambda^{(2)}(Ar^{(1)}\cos\theta + Ar^{(2)}\sin\theta) = \frac{\lambda^{(2)}}{\lambda^{(1)}}(h_1^{(1)}\cos\theta + h_2^{(1)}\sin\theta)$$

$$h_2^{(2)} = \lambda^{(2)}(-Ar^{(1)}\sin\theta + Ar^{(2)}\cos\theta) = \frac{\lambda^{(2)}}{\lambda^{(1)}}(-h_1^{(1)}\sin\theta + h_2^{(1)}\cos\theta).$$

Then, the first constraint (3) from image 2 becomes:

$$h_1^{(2)T}A^{-T}A^{-1}h_2^{(2)} = \lambda^{(2)}/\lambda^{(1)}[(\cos^2\theta - \sin^2\theta)(h_1^{(1)T}A^{-T}A^{-1}h_2^{(1)}) - \cos\theta\sin\theta(h^{(1)T}A^{-T}A^{-1}h_1^{(1)} - h_2^{(1)T}A^{-T}A^{-1}h_2^{(1)})].$$

which is a linear combination of the two constraints provided by $H_1$. Similarly, it can be shown that the second constraint from image 2 is also a linear combination of the two constraints provided by $H_1$. Therefore, $H_2$ does not provide any constraint.

The result is self-evident because parallel planes intersect with the plane at infinity at the same circular points, and thus according to Section 1.4 they provide the same constraints.

In practice, it is very easy to avoid the degenerate configuration: namely by changing the orientation of the planar pattern from one snapshot to another.

4. Experimental Results

The proposed algorithm has been tested on both computer simulated data and real data. The closed-form solution involves finding a singular value decomposition of a small 2n×6 matrix, where n is the number of images. The nonlinear refinement within the Levenberg-Marquardt algorithm takes 3 to 5 iterations to converge.

4.1 Computer Simulations

The simulated camera has the following property; $\alpha=1250$, $\beta=900$, $\gamma=1.09083$ (equivalent to 89.95°, $u_0=255$, $v_0=255$. The image resolution is 512×512. The model plane is a checker pattern containing 10×14=140 corner points (so we usually have more data in the v direction than in the u direction). The size of pattern is 18 cm×25 cm. The orientation of the plane is represented by a 3D vector r, which is parallel to the rotation axis and whose magnitude is equal to the rotation angle. Its position is represented by a 3D vector t (unit in centimeters).

4.1.1 Performance w.r.t. the Noise Level

Figure 7A:
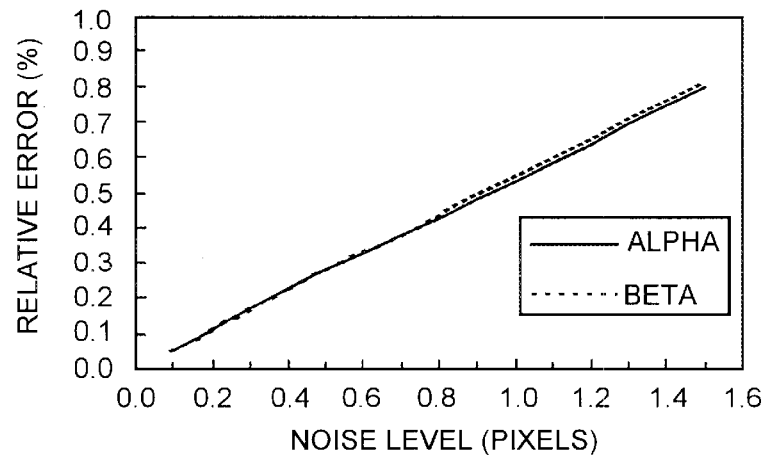
FIG. 7A is a graph plotting the percent of relative error in estimated camera parameters (i.e., $\alpha$ and $\beta$)against noise level measured in pixels.
Figure 7B:
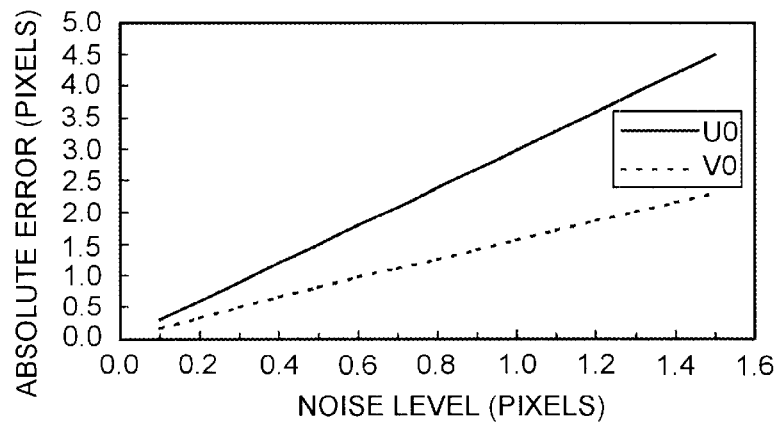
FIG. 7B is a graph plotting the absolute error in estimated camera parameters (i.e., $u_0$ and $v_0$), as measured in pixels, against noise level, also measured in pixels.

In this experiment, we use three planes with $r_1=[20°, 0, 0]^T$, $t_1=[-9, -12.5, 500]^T$, $r_2=[0, 20°, 0]^T$, $t_2=[-9, -12.5, 510]^T$, $r_3=[-30°, -30°, -15°]^T$, $t_3=[-10.5, -12.5, 525]^T$. Gaussian noise with 0 mean and $\sigma$ standard deviation is added to the projected image points. The estimated camera parameters are then compared with the ground truth. We measure the relative error for $\alpha$ and $\beta$ (FIG. 7A), and absolute error for $u_0$ and $v_0$ (FIG. 7B). We vary the noise level from 0.1 pixels to 1.5 pixels. For each noise level, we perform 100 independent trials, and the results shown are the average. As can be seen from FIGS. 7A and 7B, errors increase linearly with the noise level. (The error for $\gamma$ is not shown, but has. the same property.) For $\sigma=0.5$ (which is larger than the normal noise in practical calibration), the errors in $\alpha$ and $\beta$ are less than 0.3%, and the errors in $u_0$ and $v_0$ are around 1 pixel. The error in $u_0$ is larger than that in $v_0$. The main reason for this is that there are less data in the u direction than in the v direction.

4.1.2 Performance w.r.t. the Number of Planes

Figure 8A:
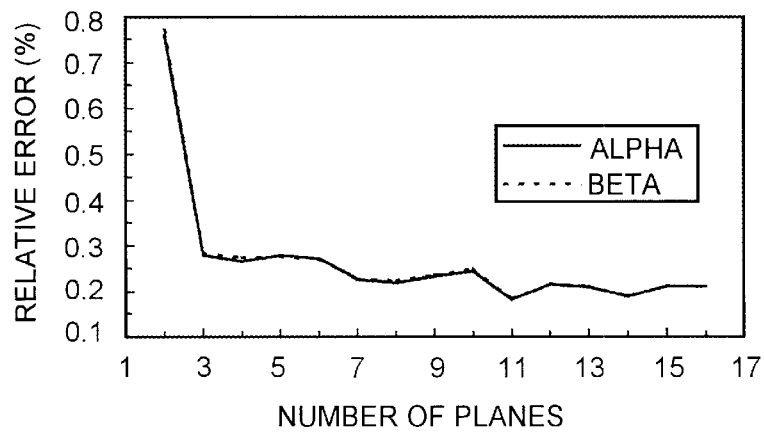
FIG. 8A is a graph plotting the percent of relative error in estimated camera parameters (i.e., $\alpha$ and $\beta$) against the number of images of a pattern on a planar surface used in estimating the parameters.
Figure 8B:
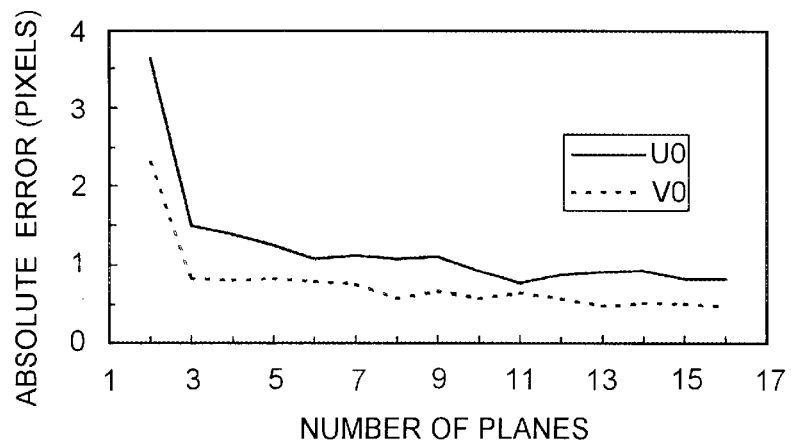
FIG. 8B is a graph plotting the absolute error in estimated camera parameters (i.e., $u_0$ and $v_0$), as measured in pixels, against the number of images of the pattern on the planar surface used in estimating the parameters.

This experiment investigates the performance with respect to the number of planes (more precisely, the number of images of the model plane). The orientation and position of the model plane for the first three images are the same as in the last subsection. From the fourth image, we first randomly choose a rotation axis in a uniform sphere, then apply a rotation angle of 30°. We vary the number of images from 2 to 16. For each number, 100 trials of independent plane orientations (except for the first three) and independent noise with mean 0 and standard deviation 0.5 pixels are conducted. The average result is shown in FIGS. 8A and 8B. The relative error for $\alpha$ and $\beta$ is shown in FIG. 8A, and absolute error for $u_0$ and $v_0$ is shown in FIG. 8B. The errors decrease when more images are used. From 2 to 3, the errors decrease significantly.

4.1.3 Performance w.r.t. the Orientation of the Model Plane

Figure 9A:
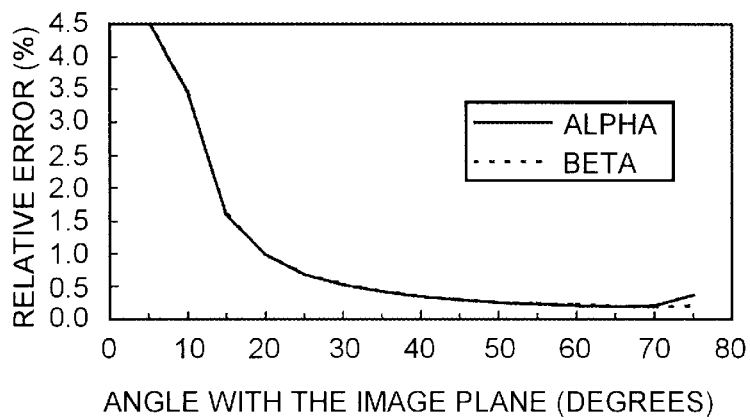
FIG. 9A is a graph plotting the percent of relative error in estimated camera parameters (i.e., $\alpha$ and $\beta$)against the angle of the pattern in space in relation to the image plane.
Figure 9B:
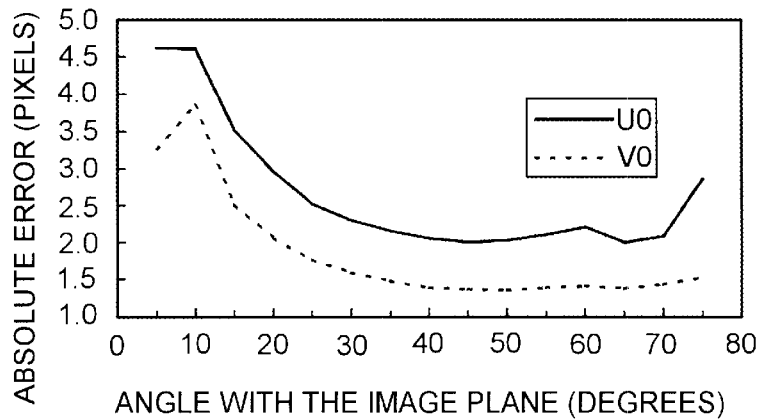
FIG. 9B is a graph plotting the absolute error in estimated camera parameters (i.e., $u_0$ and $v_0$), as measured in pixels, against the angle of the pattern in space in relation to the image plane.
Figure 10A:
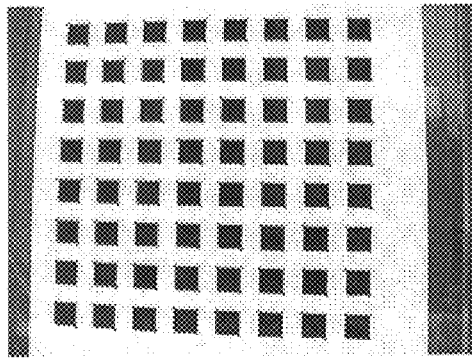
Figure 10B:
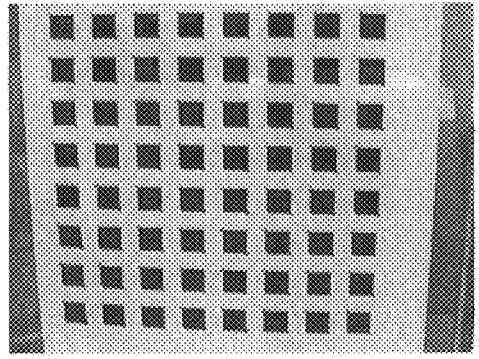
Figure 10C:
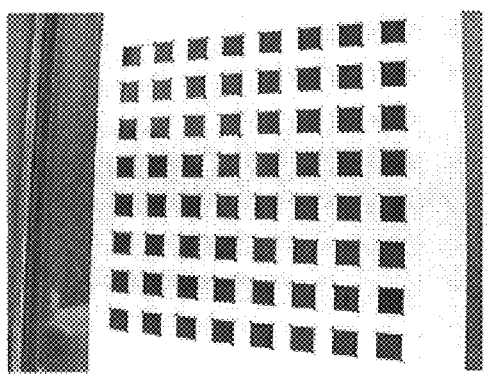
Figure 10D:
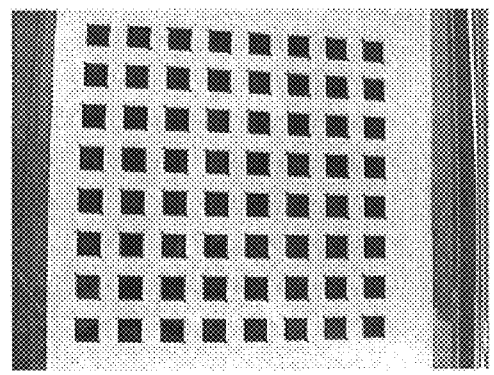

This experiment examines the influence of the orientation of the model plane with respect to the image plane. Three images are used. The orientation of the plane is chosen as follows: the plane is initially parallel to the image plane; a rotation axis is randomly chosen from a uniform sphere; the plane is then rotated around that axis with angle $\theta$. Gaussian noise with mean 0 and standard deviation 0.5 pixels is added to the projected image points. We repeat this process 100 times and compute the average errors. The angle $\theta$ varies from 5° to 75°, and the result is shown in FIGS. 9A and 9B. The relative error for $\alpha$ and $\beta$ is shown in FIG. 9A, and absolute error for $u_0$ and $v_0$ is shown in FIG. 9B. When $\theta=5°$, 40% of the trials failed because the planes are almost parallel to each other (degenerate configuration), and the result shown has excluded those trials. Best performance seems to be achieved with an angle around 45°. Note that in practice, when the angle increases, foreshortening makes the corner detection less precise, but this is not considered in this experiment.

4.2 Real Data

Here, we provide the results of using real data with an example. The camera to be calibrated is an off-the-shelf PULNiX CCD camera with 6 mm lens. The image resolution is 640×480. The model plane contains a pattern of 8×8 squares, so there are 256 corners. The size of the pattern is 17 cm×17 cm. It was printed with a high-quality printer and put on a glass. Five images of the plane under different orientations were taken, as shown in FIGS. 10(a) through 10(e). We can observe a significant lens distortion in the images. The corners were detected as the intersection of straight lines fitted to each square.

We applied our calibration algorithm to the first 2, 3, 4 and all 5 images. The results are shown in the Table of FIG. 11. For each configuration, three columns are given. The first column (initial) is the estimation of the closed-form solution. The second column (final) is the maximum likelihood estimation (MLE), and the third column ($\sigma$) is the estimated standard deviation, representing the uncertainty of the final result. As is clear, the closed-form solution is reasonable, and the final estimates are very consistent with each other whether we use 2, 3, 4 or 5 images. We also note that the uncertainty of the final estimate decreases with the number of images. The last row of the Table of FIG. 11, indicated by RMS, displays the root of mean squared distances, in pixels, between detected image points and projected ones. The MLE improves this measure considerably.

The careful reader may notice the inconsistency for $k_1$ and $k_2$ between the closed-form solution and the MLE. The reason is that for the closed-form solution, camera intrinsic parameters are estimated assuming no distortion, and the predicted outer points lie closer to the image center than the detected ones. The subsequent distortion estimation tries to spread the outer points and increase the scale in order to reduce the distances, although the distortion shape (with positive $k_1$, called pincushion distortion) does not correspond to the real distortion.(with negative $k_1$, called barrel distortion). The nonlinear refinement (MLE) finally recovers the correct distortion shape. The estimated distortion parameters allow us to correct the distortion in the original images. FIGS. 12(a) and 12(b) display the first two such distortion-corrected images, which should be compared with the first two images shown in FIGS. 10(a) and 10(b). We see clearly that the curved pattern in the original images is straightened.

4.3 Sensitivity with Respect to Model Imprecision

In the example described above, the 2D model pattern was printed on a paper with a high-quality printer. Although it is significantly cheaper to make such a high-quality 2D pattern than the classical calibration equipment, it is envisioned that a lower quality printer might be used. Thus, there may be some imprecision in the 2D model pattern if it is printed on such a printer. This section investigates the sensitivity of the proposed calibration technique with respect to model imprecision.

Figure 13A:
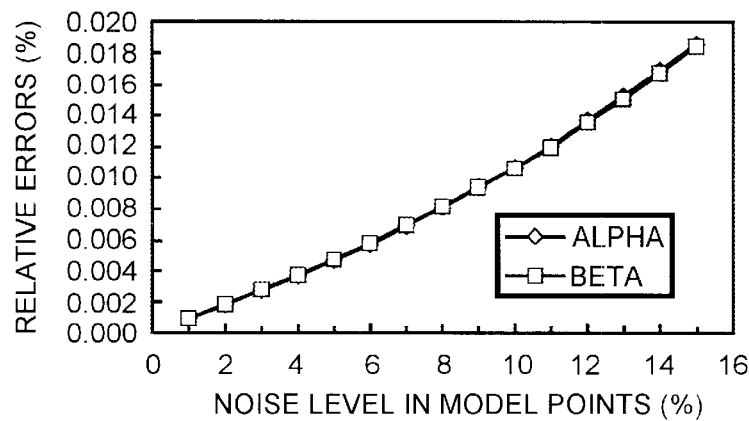
FIG. 13A is a graph plotting the percent of relative error in estimated camera parameters (i.e., $\alpha$ and $\beta$) against the level of noise introduced in the pattern on the planar surface.
Figure 13B:
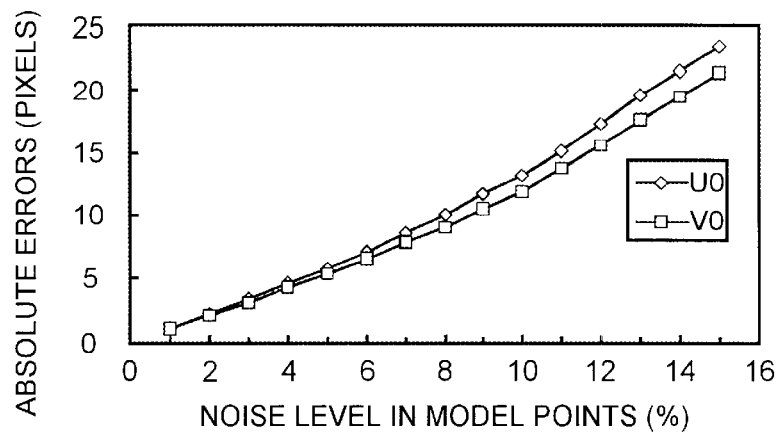
FIG. 13B is a graph plotting the absolute error in estimated camera parameters (i.e., $u_0$ and $v_0$), as measured in pixels, against the level of noise introduced in the pattern on the planar surface.
Figure 13C:
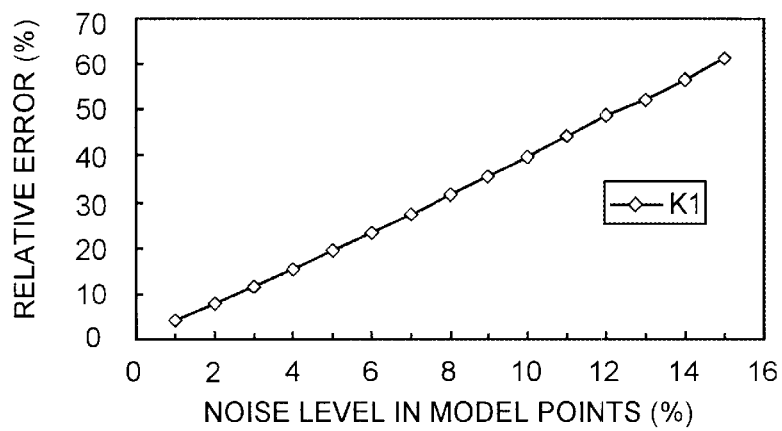
FIG. 13C is a graph plotting the percent of relative error in estimated camera parameters (i.e., $k_1$) against the level of noise introduced in the pattern on the planar surface.

We conducted this experiment on the same real data as in the last subsection. All five real images were used. To simulate model imprecision, we added Gaussian noise with zero mean to the corners of each square in the model. The standard deviation of the added noise varies from 1% to 15% of the side of each square, which is equal to 1.27 cm (more precisely, 0.5 inches). The 15% corresponds to a standard deviation of 2 mm, and people may not want to use such a poor model. For each noise level, 100 trials were conducted, and average errors (deviations from the results obtained with the true model as shown in the Table of FIG. 11) were calculated, and are depicted in FIGS. 13A through 13C. The relative error for $\alpha$ and $\beta$ is shown in FIG. 13A, the absolute error for $u_0$ and $v_0$ is shown in FIG. 13B, and the relative error for $k_1$ is shown in FIG. 13C. Obviously, all errors increase with the level of noise added to the model points. The pixel scale factors ($\alpha$ and $\beta$) remain very stable: the error is less than 0.02%. The coordinates of the principal point are quite stable: the errors are about 20 pixels for the noise level of 15%. The estimated radial distortion coefficient $k_1$ becomes less useful, and the second term $k_2$ (not shown) is even less than $k_1$.

In our current formulation, we assume that the exact position of the points in the model plane is known. If the model points are only known within certain precision, and we could expect the sort of errors reported here.

REFERENCES

[1] S. Bougnoux. From projective to euclidean space under any practical situation, a criticism of self-calibration. In *Proceedings of the 6th International Conference on Computer Vision*, pages 790–796, January 1998.

[2] D. C. Brown. Close-range camera calibration. *Photogrammetric Engineering*, 37(8):855–866, 1971.

[3] B. Caprile and V. Torre. Using Vanishing Points for Camera Calibration. *The International Journal of Computer Vision*, 4(2):127–140, March 1990.

[4] W. Faig. Calibration of close-range photogrammetry systems: Mathematical formulation. *Photogrammetric Engineering and Remote Sensing*, 41(12):1479–1486, 1975.

[5] O. Faugeras. *Three-Dimensional Computer Vision: a Geometric Viewpoint*. MIT Press, 1993.

[6] O. Faugeras, T. Luong, and S. Maybank. Camera self-calibration: theory and experiments. In G. Sandini, editor, Proc 2nd ECCV, volume 588 of *Lecture Notes in Computer Science*, pages 321–334, Santa Margherita Ligure, Italy, May 1992. Springer-Verlag.

[7] O. Faugeras and G. Toscani. The calibration problem for stereo. In *Proceedings of the IEEE Conference on Computer Vision and Pattern Recognition*, pages 15–20, Miami Beach, Fla., June 1986. IEEE.

[8] S. Ganapathy. Decomposition of transformation matrices for robot vision. *Pattern Recognition Letters*, 2:401–412, December 1984.

[9] D. Gennery. Stereo-camera calibration. In *Proceedings of the 10th Image Understanding Work-shop*, pages 101–108, 1979.

[10] G. Golub and C. van Loan. *Matrix Computations*. The John Hopkins University Press, Baltimore, Md., 3 edition, 1996.

[11] R. Hartley. Self-calibration from multiple views with a rotating camera. In J.-O. Eklundh, editor, *Proceedings of the 3rd European Conference on Computer Vision*, volume 800–801 of *Lecture Notes in Computer Science*, pages 471–478, Stockholm, Sweden, May 1994. Springer-Verlag.

[12] R. Hartley. In defense of the 8-point algorithm. In *Proceedings of the 5th International Conference on Computer Vision*, pages 1064–1070, Boston, Mass., June 1995. IEEE Computer Society Press.

[13] R. I. Hartley. An algorithm for self calibration from several views. In *Proceedings of the IEEE Conference on Computer Vision and Pattern Recognition*, pages 908–912, Seattle, Wash., June 1994. IEEE.

[14] D. Liebowitz and A. Zisserman. Metric rectification for perspective images of planes. In *Proceedings of the IEEE Conference on Computer Vision and Pattern Recognition*, pages 482–488, Santa Barbara, Calif., June 1998. IEEE Computer Society.

[15] Q.-T. Luong. *Matrice Fondamentale et Calibration Visuelle sur l'Environnement-Vers une plus grande autonomie des syst`emes robotiques*. PhD thesis, Universit' e de Paris-Sud, Centre d'Orsay, December 1992.

[16] Q.-T. Luong and O. Faugeras. Self-calibration of a moving camera from point correspondences and fundamental matrices. *The International Journal of Computer Vision*, 22(3):261–289, 1997.

[17] S. J. Maybank and O. D. Faugeras. A theory of self-calibration of a moving camera. *The International Journal of Computer Vision*, 8(2):123–152, August 1992.

[18] J. More. The levenberg-marquardt algorithm, implementation and theory. In G. A. Watson, editor, *Numerical Analysis*, Lecture Notes in Mathematics 630. Springer-Verlag, 1977.

[19] I. Shimizu, Z. Zhang, S. Akamatsu, and K. Deguchi. Head pose determination from one image using a generic model. In *Proceedings of the IEEE Third International Conference on Automatic Face and Gesture Recognition*, pages 100–105, Nara, Japan, April 1998.

[20] C. C. Slama, editor. *Manual of Photogrammetry*. American Society of Photogrammetry, fourth edition, 1980.

[21] G. Stein. Accurate internal camera calibration using rotation, with analysis of sources of error. In *Proc. Fifth International Conference on Computer Vision*, pages 230–236, Cambridge, Mass., June 1995.

[22] B. Triggs. Autocalibration from planar scenes. In *Proceedings of the 5th. European Conference on Computer Vision*, pages 89–105, Freiburg, Germany, June 1998.

[23] R. Y. Tsai. A versatile camera calibration technique for high-accuracy 3D machine vision metrology using off-the-shelf tv cameras and lenses. *IEEE Journal of Robotics and Automation*, 3(4):323–344, August 1987.

[24] G. Wei and S. Ma. A complete two-plane camera calibration method and experimental comparisons. In *Proc. Fourth International Conference on Computer Vision*, pages 439–446, Berlin, May 1993.

[25] G. Wei and S. Ma. Implicit and explicit camera calibration: Theory and experiments. *IEEE Transactions on Pattern Analysis and Machine Intelligence*, 16(5):469–480, 1994.

[26] J. Weng, P. Cohen, and M. Herniou. Camera calibration with distortion models and accuracy evaluation. *IEEE Transactions on Pattern Analysis and Machine Intelligence*, 14(10):965–980, October 1992.

[27] Z. Zhang. Motion and structure from two perspective views: From essential parameters to euclidean motion via fundamental matrix. *Journal of the Optical Society of America A*, 14(11):2938–2950, 1997.

What is claimed is:

1. A computer-implemented calibration process for a digital camera, comprising the following steps:
   acquiring an object having a planar surface and a pattern disposed on said planar surface;
   establishing surface coordinates of at least four feature points of the pattern on the planar surface;
   capturing at least two images of the planar pattern with the camera being calibrated, each of said images depicting the pattern from a different, non-parallel orientation; and
   using a computer to,
      ascertain the image coordinates of every image point in each captured image that depicts one of said feature points of the pattern, and
      estimating unknown intrinsic parameters of the digital camera using the surface coordinates of the feature points of the pattern and the image coordinates of the corresponding images points in each of the captured images.

2. The process of claim 1, wherein the image capturing step comprises capturing at least 3 images of the pattern.

3. The process of claim 1, further comprising the step of estimating unknown extrinsic parameters for each of the captured images by using the estimated intrinsic parameters of the camera, the surface coordinates of the feature points of the pattern and the image coordinates of the corresponding images points in the captured images.

4. The process of claim 3, wherein the steps of estimating the intrinsic parameters and estimating the extrinsic parameters comprises the steps of:
   (a) computing a separate homography between the pattern on the planar surface of the object and each of the captured images using the surface coordinates of the feature points of the pattern and the image coordinates of the corresponding images points in the captured image for which the homography is being computed;
   (b) estimating the intrinsic parameters of the camera using the homographies computed for the captured images; and
   (c) estimating the extrinsic parameters for each of the captured images using the estimated intrinsic parameters and the homography associated with the particular image for which the extrinsic parameters are being estimated.

5. The process of claim 4, further comprising the step of refining the estimates of the intrinsic parameters and extrinsic parameters by compensating for radial distortion in the captured images caused by the lens of the camera, said refining step comprising the steps of:
   (aa) computing estimates of coefficients of radial distortion attributable to the lens of the camera using the last computed estimate of the camera's intrinsic parameter set and the coordinates of the image points in each of the captured images;
   (bb) computing estimates of distortion-free image coordinates for each of the image points in each of the captured images using the last computed coefficients of radial distortion;
   (cc) computing refined estimates of the camera's intrinsic parameters and the extrinsic parameters associated with each of the captured images by performing steps (a) through (c), using the distortion-free image coordinates in place of the previously ascertained image coordinates;
   (dd) re-computing estimates of coefficients of radial distortion attributable to the lens of the camera using the last refined estimate of the camera's intrinsic parameters and the coordinates of the image points in each of the captured images;
   (ee) re-computing estimates of distortion-free image coordinates for each of the image points in each of the captured images using the last re-computed coefficients of radial distortion;
   (ff) re-computing refined estimates of the camera's intrinsic parameters and the extrinsic parameters associated with each of the captured images by performing steps (a) through (c), using the distortion-free image coordinates in place of the previously ascertained image coordinates;
   (gg) comparing the last computed estimate of the coefficients of radial distortion to the next to last estimate of the coefficients;
   (hh) repeating steps (dd) through (gg) whenever the compared coefficients equal or exceed a prescribed difference threshold; and
   (ii) designate the last re-computed refined estimates of the camera's intrinsic parameters and the extrinsic parameters associated with each of the captured images as the revised final estimates whenever the compared coefficients fall below the prescribed difference threshold.

6. The process of claim 3, wherein the steps of estimating the intrinsic parameters and estimating the extrinsic parameters comprises the steps of:
   (a) generating a series of candidate intrinsic parameter sets for the camera;
   (b) for each candidate intrinsic parameter set,
      computing an estimated extrinsic parameter set for each of the captured images using the intrinsic parameter set candidate, the surface coordinates of the feature points of the pattern and the image coordinates of the corresponding images points in the captured images,
      projecting each feature point of the pattern into the captured images using the candidate intrinsic parameter set and the last computed extrinsic parameter set associated with the image into which the feature point is being projected,
      computing an indicator of the difference between the image coordinates of each image point in each captured image and coordinates of a corresponding projected feature point,
      summing the difference indicators computed for each image point in an captured image to produce a combined difference indicator, and summing the combined difference indicators of each captured image to produce a maximum likelihood estimate indicator;

(c) identifying the smallest maximum likelihood estimate indicator; and (d) designating the candidate intrinsic parameter set, and the associated extrinsic parameter set for each image, corresponding to the smallest maximum likelihood estimate indicator, as the final estimates for the intrinsic parameter set and extrinsic parameter sets, respectively.

7. The process of claim 6, wherein the initial estimate of the intrinsic parameter set of the camera and the extrinsic parameter sets associated with each of the captured images are derived beforehand, said deriving comprising the steps of:

computing a separate homography between the pattern on the planar surface of the object and each of the captured images using the surface coordinates of the feature points of the pattern and the image coordinates of the corresponding images points in the captured image for which the homography is being computed;

estimating the intrinsic parameters of the camera using the homographies computed for the captured images; and estimating the extrinsic parameters for each of the captured images using the estimated intrinsic parameters and the homography associated with the particular image for which the extrinsic parameters are being estimated.

8. The process of claim 6, wherein the step of computing an indicator of the difference between the image coordinates of the selected image point and image coordinates of the corresponding projected feature point comprises computing the difference in distance between the image coordinates of the selected image point and image coordinates of the corresponding projected feature point.

9. The process of claim 6, further comprising the step of refining the estimates of the intrinsic parameter set and extrinsic parameter sets via an iterative procedure, said iterative procedure comprising the steps of:

assigning a number of iterations to be completed to produce the refined estimates;

for each iteration computing a new estimate of the intrinsic parameter set and extrinsic parameter sets using the estimates thereof computed in the last iteration as initializing estimates in the current iteration; and assigning the last computed estimates of the intrinsic parameter set and extrinsic parameter sets as the revised final estimates.

10. The process of claim 6, further comprising the step of refining the estimates of the intrinsic parameter set and extrinsic parameter sets by compensating for radial distortion in the captured images caused by the lens of the camera, said refining step comprising the steps of:

(aa) computing estimates of coefficients of radial distortion attributable to the lens of the camera using the last computed estimate of the camera's intrinsic parameter set and the coordinates of the image points in each of the captured images;

(bb) computing estimates of distortion-free image coordinates for each of the image points in each of the captured images using the last computed coefficients of radial distortion;

(cc) computing refined estimates of the camera's intrinsic parameter set and the extrinsic parameter set associated with each of the captured images by performing steps (a) through (d), using the distortion-free image coordinates in place of the previously ascertained image coordinates;

(dd) re-computing estimates of coefficients of radial distortion attributable to the lens of the camera using the last refined estimate of the camera's intrinsic parameter set and the coordinates of the image points in each of the captured images;

(ee) re-computing estimates of distortion-free image coordinates for each of the image points in each of the captured images using the last re-computed coefficients of radial distortion;

(ff) re-computing refined estimates of the camera's intrinsic parameter set and the extrinsic parameter set associated with each of the captured images by performing steps (a) through (d), using the distortion-free image coordinates in place of the previously ascertained image coordinates;

(gg) comparing the last computed estimate of the coefficients of radial distortion to the next to last estimate of the coefficients;

(hh) repeating steps (dd) through (gg) whenever the compared coefficients equal or exceed a prescribed difference threshold; and (ii) designate the last re-computed refined estimates of the camera's intrinsic parameter set and the extrinsic parameter set associated with each of the captured images as the revised final estimates whenever the compared coefficients fall below the prescribed difference threshold.

11. The process of claim 3, wherein the steps of estimating the intrinsic parameters and estimating the extrinsic parameters comprises the steps of:

generating a series of candidate intrinsic parameter sets for the camera;

for each candidate intrinsic parameter set, computing an estimated extrinsic parameter set for each of the captured images using the intrinsic parameter set candidate, the surface coordinates of the feature points of the pattern and the image coordinates of the corresponding images points in the captured images, computing estimates of coefficients of radial distortion attributable to the lens of the camera using the candidate intrinsic parameter set and the coordinates of the image points in each of the captured images, projecting each feature point of the pattern into the captured images using the candidate intrinsic parameter set and the last computed extrinsic parameter set associated with the image into which the feature point is being projected, re-computing the image coordinates of each projected feature point to account for radial distortion using the computed estimates of the coefficients of radial distortion and the intrinsic parameter set candidate, computing an indicator of the difference between the image coordinates of each image point in each captured image and coordinates of a corresponding radially distorted projected feature point, summing the difference indicators computed for each image point in an captured image to produce a combined difference indicator, and summing the combined difference indicators of each captured image to produce a complete maximum likelihood estimate indicator;

identifying the smallest maximum likelihood estimate indicator; and designating the candidate intrinsic parameter set, and the associated extrinsic parameter set for each image, corresponding to the smallest maximum likelihood estimate indicator, as the final estimates for the intrinsic parameter set and extrinsic parameter sets, respectively.

12. The process of claim 11, wherein the initial estimate of the intrinsic parameter set of the camera and the extrinsic parameter sets associated with each of the captured images are derived beforehand, said deriving comprising the steps of:

computing a separate homography between the pattern on the planar surface of the object and each of the captured images using the surface coordinates of the feature points of the pattern and the image coordinates of the corresponding images points in the captured image for which the homography is being computed;

estimating the intrinsic parameters of the camera using the homographies computed for the captured images; and estimating the extrinsic parameters for each of the captured images using the estimated intrinsic parameters and the homography associated with the particular image for which the extrinsic parameters are being estimated.

13. The process of claim 11, wherein the step of computing an indicator of the difference between the image coordinates of the selected image point and image coordinates of the corresponding distorted projected feature point comprises computing the difference in distance between the image coordinates of the selected image point and image coordinates of the corresponding distorted projected feature point.

14. The process of claim 11, further comprising the step of refining the estimates of the intrinsic parameter set and extrinsic parameter sets via an iterative procedure, said iterative procedure comprising the steps of:

assigning a number of iterations to be completed to produce the refined estimates;

for each iteration, computing a new estimate of the intrinsic parameter set and extrinsic parameter sets using the estimates thereof computed in the last iteration as initializing estimates in the current iteration; and assigning the last computed estimates of the intrinsic parameter set and extrinsic parameter sets as the revised final estimates.

15. A system for calibrating a digital camera, comprising:

a planar surface having a pattern disposed thereon, wherein surface coordinates of at least four feature points of the pattern oh the planar surface have been identified;

multiple images of the planar pattern captured using the camera to be calibrated, wherein each of said images depicts the pattern from a different, non-parallel orientation;

a general purpose computing device; and a computer program comprising program modules executable by the computing device, wherein the computing device is directed by the program modules of the computer program to, ascertain the image coordinates of every image point in each captured image depicting one of the feature points of the pattern, and estimate intrinsic parameters of the digital camera using the surface coordinates of the feature points of the pattern and the image coordinates of the corresponding images points in each of the captured images.

16. The system of claim 15, wherein there are at least 3 images of the pattern that have been captured using the camera to be calibrated.

17. The system of claim 15, further comprising the program module for estimating unknown extrinsic parameters for each of the captured images using the estimated intrinsic parameters of the camera, the surface coordinates of the feature points of the pattern and the image coordinates of the corresponding images points in the captured images.

18. The system of claim 17, wherein the program modules for estimating the intrinsic parameters and estimating the extrinsic parameters comprise sub-modules for:

(a) selecting a previously unselected one of the captured images;

(b) computing a homography between the pattern on the planar surface of the object and the selected image using the surface coordinates of the feature points of the pattern and the image coordinates of the corresponding images points in the selected image;

(c) repeating (a) and (b) for each of the captured images;

(d) estimating the intrinsic parameters of the camera using the homographies computed for the captured images; and (e) estimating the extrinsic parameters for each of the captured images using the estimated intrinsic parameters and the homography associate ed with the particular image for which the extrinsic parameters are being estimated.

19. The system of claim 18, further comprising a program module for refining the estimates of the intrinsic parameters and extrinsic parameters by compensating for radial distortion in the captured images caused by the lens of the camera, said refining module comprising the sub-modules for:

(aa) computing estimates of coefficients of radial distortion attributable to the lens of the camera using the last computed estimate of the camera's intrinsic parameter set and the coordinates of the image points in each of the captured images;

(bb) computing estimates of distortion-free image coordinates for each of the image points in each of the captured images using the last computed coefficients of radial distortion;

(cc) computing refined estimates of the camera's intrinsic parameters and the extrinsic parameters associated with each of the captured images by performing (a) through (e) using the distortion-free image coordinates in place of the previously ascertained image coordinates;

(dd) re-computing estimates of coefficients of radial distortion attributable to the lens of the camera using the last refined estimate of the camera's intrinsic parameters and the coordinates of the image points in each of the captured images;

(ee) re-computing estimates of distortion-free image coordinates for each of the image points in each of the captured images using the last re-computed coefficients of radial distortion;

(ff) re-computing refined estimates of the camera's intrinsic parameters and the extrinsic parameters associated with each of the captured images by performing (a) through (e) using the distortion-free image coordinates in place of the previously ascertained image coordinates;

(gg) comparing the last computed estimate of the coefficients of radial distortion to the next to last estimate of the coefficients;

(hh) repeating (dd) through (gg) whenever the compared coefficients equal or exceed a prescribed difference threshold; and (ii) designate the last re-computed refined estimates of the camera's intrinsic parameters and the extrinsic parameters associated with each of the captured images as the revised final estimates whenever the compared coefficients fall below the prescribed difference threshold.

20. The system of claim 17, wherein the program modules for estimating the intrinsic parameters and estimating the extrinsic parameters comprises sub-modules for:

(a) selecting a previously unselected one of the captured images;

(b) choosing a previously unselected one of the image points in the selected image;

(c) projecting the feature point of the pattern corresponding to the selected image point into the selected image using an initial estimate of an intrinsic parameter set of the camera and an extrinsic parameter set associated with the selected image;

(d) computing an indicator of the difference between the image coordinates of the selected image point and image coordinates of the corresponding projected feature point;

(e) repeating (b) through (d) for each image point in the selected image;

(f) summing the difference indicators computed for each image point in the selected image to produce a combined difference indicator;

(g) repeating (a) through (f) for each of the captured images;

(h) summing the combined difference indicators to produce a maximum likelihood estimate indicator;

(i) generating a series of candidate intrinsic parameter sets for the camera, exclusive of the initial estimated intrinsic parameter set;

(j) selecting a previously unselected one of he candidate intrinsic parameter sets;

(k) computing an estimated extrinsic parameter set for each of the captured images using the selected intrinsic parameter set candidate;

(l) selecting one of the captured images;

(m) choosing one of the image points in the selected image;

(n) projecting the feature point of the pattern corresponding to the chosen image point into the selected image using an the selected intrinsic parameter set candidate and the last computed extrinsic parameter set associated with the selected image;

(o) computing an indicator of the difference between the image coordinates of the selected image point and image coordinates of the corresponding projected feature point;

(p) repeating (n) and (o) for each remaining image point in the selected image;

(q) summing the difference indicators computed for each image point in the selected image to produce another combined difference indicator;

(r) repeating (m) through (q) for each remaining captured image;

(s) summing the combined difference indicators computed in conjunction with the selected intrinsic parameter set candidate to produce another maximum likelihood estimate indicator;

(t) repeating 0) through (s) for each of the candidate intrinsic parameter sets;

(u) identifying the smallest maximum likelihood estimate indicator; and (v) designating the candidate intrinsic parameter set, and the extrinsic parameter set for each image, associated with the smallest maximum likelihood estimate indicator as the final estimates for the intrinsic parameter set and extrinsic parameter sets, respectively.

21. The system of claim 20, wherein the initial estimate of the intrinsic parameter set of the camera and the extrinsic parameter sets associated with each of the captured images are derived beforehand via a deriving program module comprising sub-modules for:

computing a separate homography between the pattern on the planar surface of the object and each of the captured images using the surface coordinates of the feature points of the pattern and the image coordinates of the corresponding images points in the captured image for which the homography is being computed;

estimating the intrinsic parameters of the camera using the homographies computed for the captured images; and estimating the extrinsic parameters for each of the captured images using the estimated intrinsic parameters and the homography associated with the particular image for which the extrinsic parameters are being estimated.

22. The system of claim 20, wherein the sub-module for computing the indicator of the difference between the image coordinates of the selected image point and image coordinates of the corresponding projected feature point comprises computing the difference in distance between the image coordinates of the selected image point and image coordinates of the corresponding projected feature point.

23. The system of claim 20, further comprising a program module for refining the estimates of the intrinsic parameter set and extrinsic parameter sets via an iterative procedure, said iteration program module comprising sub-modules for:

assigning a number of iterations to be completed to produce the refined estimates;

for each iteration, computing a new estimate of the intrinsic parameter set and extrinsic parameter sets using the estimates thereof computed in the last iteration as initializing estimates in the current iteration; and assigning the last computed estimates of the intrinsic parameter set and extrinsic parameter sets as the revised final estimates.

24. The system of claim 20, further comprising a program module for refining the estimates of the intrinsic parameters and extrinsic parameters by compensating for radial distortion in the captured images caused by the lens of the camera, said refining module comprising the sub-modules for:

(aa) computing estimates of coefficients of radial distortion attributable to the lens of the camera using the last computed estimate of the camera's intrinsic parameter set and the coordinates of the image points in each of the captured images;

(bb) computing estimates of distortion-free image coordinates for each of the image points in each of the captured images using the last computed coefficients of radial distortion;

(cc) computing refined estimates of the camera's intrinsic parameter set and the extrinsic parameter set associated with each of the captured images by performing (a) through (v) using the distortion-free image coordinates in place of the previously ascertained image coordinates;

29

(dd) re-computing estimates of coefficients of radial distortion attributable to the lens of the camera using the last refined estimate of the camera's intrinsic parameter set and the coordinates of the image points in each of the captured images;

(ee) re-computing estimates of distortion-free image coordinates for each of the image points in each of the captured images using the last re-computed coefficients of radial distortion;

(ff) re-computing refined estimates of the camera's intrinsic parameter set and the extrinsic parameter set associated with each of the captured images by performing (a) through (v) using the distortion-free image coordinates in place of the previously ascertained image coordinates;

(gg) comparing the last computed estimate of the coefficients of radial distortion to the next to last estimate of the coefficients;

(hh) repeating (dd) through (gg) whenever the compared coefficients equal or exceed a prescribed difference threshold; and (ii) designate the last re-computed refined estimates of the camera's intrinsic parameter set and the extrinsic parameter set associated with each of the captured images as the revised final estimates whenever the compared coefficients fall below the prescribed difference threshold.

25. The system of claim 17, wherein the program modules for estimating the intrinsic parameters and estimating the extrinsic parameters comprises sub-modules for:

(a) computing estimates of coefficients of radial distortion attributable to the lens of the camera using initial estimates of the camera's intrinsic parameter set and the coordinates of the image points in each of the captured images;

(b) selecting a previously unselected one of the captured images;

(c) choosing a previously unselected one of the image points in the selected image;

(d) projecting the feature point of the pattern corresponding to the selected image point into the selected image using the initial estimate of an intrinsic parameter set of the camera and an extrinsic parameter set associated with the selected image;

(e) re-computing the image coordinates of the projected feature point to account for radial distortion using the computed estimates of the coefficients of radial distortion and the initial estimate of an intrinsic parameter set;

(f) computing an indicator of the difference between the image coordinates of the selected image point and image coordinates of the corresponding distorted projected feature point;

(g) repeating (c) through (f) for each image point in the selected image;

(h) summing the difference indicators computed for each image point in the selected image to produce a combined difference indicator;

(i) repeating (b) through (h) for each of the captured images;

(j) summing the combined difference indicators to produce a complete maximum likelihood estimate indicator;

(k) generating a series of candidate intrinsic parameter sets for the camera, exclusive of the initial estimated intrinsic parameter set;

30

(l) selecting a previously unselected one of the candidate intrinsic parameter sets;

(m) computing an estimated extrinsic parameter set for each of the captured images using the selected intrinsic parameter set candidate, the surface coordinates of the feature points of the pattern and the image coordinates of the corresponding images points in the captured images;

(n) computing estimates of the coefficients of radial distortion attributable to the lens of the camera using the selected candidate intrinsic parameter set and the coordinates of the image points in each of the captured images;

(o) selecting one of the captured images;

(p) choosing one of the image points in the selected image;

(q) projecting the feature point of the pattern corresponding to the chosen image point into the selected image using an the selected intrinsic parameter set candidate and the last computed extrinsic parameter set associated with the selected image;

(r) re-computing the image coordinates of the projected feature point to account for radial distortion using the last computed estimates of the coefficients of radial distortion and selected intrinsic parameter set candidate;

(s) computing an indicator of the difference between the image coordinates of the selected image point and image coordinates of the corresponding distorted projected feature point;

(t) repeating (q) and (s) for each remaining image point in the selected image;

(u) summing the difference indicators computed for each image point in the selected image to produce another combined difference indicator;

(v) repeating (p) through (u) for each remaining captured image;

(w) summing the combined difference indicators computed in conjunction with the selected intrinsic parameter set candidate to produce another complete maximum likelihood estimate indicator;

(x) repeating (l) through (w) for each of the candidate intrinsic parameter sets;

(y) identifying the smallest maximum likelihood estimate indicator; and (z) designating the candidate intrinsic parameter set, and the extrinsic parameter set for each image, associated with the smallest maximum likelihood estimate indicator as the final estimates for the intrinsic parameter set and extrinsic parameter sets, respectively.

26. The system of claim 25, wherein the initial estimate of the intrinsic parameter set of the camera and the extrinsic parameter sets associated with each of the captured images are derived beforehand via a deriving program module comprising sub-modules for:

computing a separate homography between the pattern on the planar surface of the object and each of the captured images using the surface coordinates of the feature points of the pattern and the image coordinates of the corresponding images points in the captured image for which the homography is being computed;

estimating the intrinsic parameters of the camera using the homographies computed for the captured images; and estimating the extrinsic parameters for each of the captured images using the estimated intrinsic parameters and the homography associated with the particular image for which the extrinsic parameters are being estimated.

27. The system of claim 25, wherein the sub-module for computing an indicator of the difference between the image coordinates of the selected image point and image coordinates of the corresponding distorted projected feature point comprises computing the difference in distance between the image coordinates of the selected image point and image coordinates of the corresponding distorted projected feature point.

28. The system of claim 25, further comprising a program module for refining the estimates of the intrinsic parameter set and extrinsic parameter sets via an iterative procedure, said iteration program module comprising sub-modules for:
 assigning a number of iterations to be completed to produce the refined estimates;
 for each iteration, computing a new estimate of the intrinsic parameter set and extrinsic parameter sets using the estimates thereof computed in the last iteration as initializing estimates in the current iteration; and
 assigning the last computed estimates of the intrinsic parameter set and extrinsic parameter sets as the revised final estimates.

29. A computer-readable memory for calibrating a digital camera, comprising:
 a computer-readable storage medium; and
 a computer program comprising program modules stored in the storage medium, wherein the storage medium is so configured by the computer program that it causes a computer to,
  ascertain image coordinates of every image point in each image in a set of multiple images captured by the camera being calibrated and depicting a pattern disposed on a planar surface from a different non-parallel orientation, said pattern having at least four feature points with known surface coordinates; and
  estimate intrinsic parameters of the digital camera using the surface coordinates of the feature points of the pattern and the images coordinates of the corresponding images points in each of the captured images.

30. The computer-readable memory of claim 29, wherein there are at least 3 images of the pattern that have been captured using the camera to be calibrated.

31. The computer-readable memory of claim 29, further comprising the program module for estimating unknown extrinsic parameters for each of the captured images using the estimated intrinsic parameters of the camera, the surface coordinates of the feature points of the pattern and the image coordinates of the corresponding images points in the captured images.

32. The computer-readable memory of claim 31, wherein the program modules for estimating the intrinsic parameters and estimating the extrinsic parameters comprise sub-modules for:
 (a) selecting a previously unselected one of the captured images;
 (b) computing a homography between the pattern on the planar surface of the object and the selected image using the surface coordinates of the feature points of the pattern and the image coordinates of the corresponding images points in the selected image;
 (c) repeating (a) and (b) for each of the captured images;
 (d) estimating the intrinsic parameters of the camera using the homographies computed for the captured images; and
 (e) estimating the extrinsic parameters for each of the captured images using the estimated intrinsic parameters and the homography associated with the particular image for which the extrinsic parameters are being estimated.

33. The computer-readable memory of claim 32, further comprising a program module for refining the estimates of the intrinsic parameters and extrinsic parameters by compensating for radial distortion in the captured images caused by the lens of the camera, said refining module comprising the sub-modules for:
 (aa) computing estimates of coefficients of radial distortion attributable to the lens of the camera using the last computed estimate of the camera's intrinsic parameter set and the coordinates of the image points in each of the captured images;
 (bb) computing estimates of distortion-free image coordinates for each of the image points in each of the captured images using the last computed coefficients of radial distortion;
 (cc) computing refined estimates of the camera's intrinsic parameters and the extrinsic parameters associated with each of the captured images by performing (a) through (e) using the distortion-free image coordinates in place of the previously ascertained image coordinates;
 (dd) re-computing estimates of coefficients of radial distortion attributable to the lens of the camera using the last refined estimate of the camera's intrinsic parameters and the coordinates of the image points in each of the captured images;
 (ee) re-computing estimates of distortion-free image coordinates for each of the image points in each of the captured images using the last re-computed coefficients of radial distortion;
 (ff) re-computing refined estimates of the camera's intrinsic parameters and the extrinsic parameters associated with each of the captured images by performing (a) through (e) using the distortion-free image coordinates in place of the previously ascertained image coordinates;
 (gg) comparing the last computed estimate of the coefficients of radial distortion to the next to last estimate of the coefficients;
 (hh) repeating (dd) through (gg) whenever the compared coefficients equal or exceed a prescribed difference threshold; and
 (ii) designate the last re-computed refined estimates of the camera's intrinsic parameters and the extrinsic parameters associated with each of the captured images as the revised final estimates whenever the compared coefficients fall below the prescribed difference threshold.

34. The computer-readable memory of claim 31, wherein the program modules for estimating the intrinsic parameters and estimating the extrinsic parameters comprises sub-modules for:
 (a) selecting a previously unselected one of the captured images;
 (b) choosing a previously unselected one of the image points in the selected image;
 (c) projecting the feature point of the pattern corresponding to the selected image point into the selected image using an initial estimate of an intrinsic parameter set of the camera and an extrinsic parameter set associated with the selected image;
 (d) computing an indicator of the difference between the image coordinates of the selected image point and image coordinates of the corresponding projected feature point;

(e) repeating (b) through (d) for each image point in the selected image;

(f) summing the difference indicators computed for each image point in the selected image to produce a combined difference indicator;

(g) repeating (a) through (f) for each of the captured images;

(h) summing the combined difference indicators to produce a maximum likelihood estimate indicator;

(i) generating a series of candidate intrinsic parameter sets for the camera, exclusive of the initial estimated intrinsic parameter set;

(j) selecting a previously unselected one of he candidate intrinsic parameter sets;

(k) computing an estimated extrinsic parameter set for each of the captured images using the selected intrinsic parameter set candidate;

(l) selecting one of the captured images;

(m) choosing one of the image points in the selected image;

(n) projecting the feature point of the pattern corresponding to the chosen image point into the selected image using an the selected intrinsic parameter set candidate and the last computed extrinsic parameter set associated with the selected image;

(o) computing an indicator of the difference between the image coordinates of the selected image point and image coordinates of the corresponding projected feature point;

(p) repeating (n) and (o) for each remaining image point in the selected image;

(q) summing the difference indicators computed for each image point in the selected image to produce another combined difference indicator;

(r) repeating (m) through (q) for each remaining captured image;

(s) summing the combined difference indicators computed in conjunction with the selected intrinsic parameter set candidate to produce another maximum likelihood estimate indicator;

(t) repeating (j) through (s) for each of the candidate intrinsic parameter sets;

(u) identifying the smallest maximum likelihood estimate indicator; and (v) designating the candidate intrinsic parameter set, and the extrinsic parameter set for each image, associated with the smallest maximum likelihood estimate indicator as the final estimates for the intrinsic parameter set and extrinsic parameter sets, respectively.

35. The computer-readable memory of claim 34, wherein the initial estimate of the intrinsic parameter set of the camera and the extrinsic parameter sets associated with each of the captured images are derived beforehand via a deriving program module comprising sub-modules for:

computing a separate homography between the pattern on the planar surface of the object and each of the captured images using the surface coordinates of the feature points of the pattern and the image coordinates of the corresponding images points in the captured image for which the homography is being computed;

estimating the intrinsic parameters of the camera using the homographies computed for the captured images; and estimating the extrinsic parameters for each of the captured images using the estimated intrinsic parameters and the homography associated with the particular image for which the extrinsic parameters are being estimated.

36. The computer-readable memory of claim 34, wherein the sub-module for computing the indicator of the difference between the image coordinates of the selected image point and image coordinates of the corresponding projected feature point comprises computing the difference in distance between the image coordinates of the selected image point and image coordinates of the corresponding projected feature point.

37. The computer-readable memory of claim 34, further comprising a program module for refining the estimates of the intrinsic parameter set and extrinsic parameter sets via an iterative procedure, said iteration program module comprising sub-modules for:

assigning a number of iterations to be completed to produce the refined estimates;

for each iteration, computing a new estimate of the intrinsic paramter set and extrinsic parameter sets using estimates thereof computed in the last iteration as initializing estimates in the current iterationl; and assigning the last computed estimates of the intrinsic parameter set and extrinsic parameter sets as the revised final estimates.

38. The computer-readable memory of claim 34, further comprising a program module for refining the estimates of the intrinsic parameters and extrinsic parameters by compensating for radial distortion in the captured images caused by the lens of the camera, said refining module comprising the sub-modules for:

(aa) computing estimates of coefficients of radial distortion attributable to the lens of the camera using the last computed estimate of the camera's intrinsic parameter set and the coordinates of the image points in each of the captured images;

(bb) computing estimates of distortion-free image coordinates for each of the image points in each of the captured images using the last computed coefficients of radial distortion;

(cc) computing refined estimates of the camera's intrinsic parameter set and the extrinsic parameter set associated with each of the captured images by performing (a) through (v) using the distortion-free image coordinates in place of the previously ascertained image coordinates;

(dd) re-computing estimates of coefficients of radial distortion attributable to the lens of the camera using the last refined estimate of the camera's intrinsic parameter set and the coordinates of the image points in each of the captured images;

(ee) re-computing estimates of distortion-free image coordinates for each of the image points in each of the captured images using the last re-computed coefficients of radial distortion;

(ff) re-computing refined estimates of the camera's intrinsic parameter set and the extrinsic parameter set associated with each of the captured images by performing (a) through (v) using the distortion-free image coordinates in place of the previously ascertained image coordinates;

(gg) comparing the last computed estimate of the coefficients of radial distortion to the next to last estimate of the coefficients;

(hh) repeating (dd) through (gg) whenever the compared coefficients equal or exceed a prescribed difference threshold; and (ii) designate the last re-computed refined estimates of the camera's intrinsic parameter set and the extrinsic parameter set associated with each of the captured images as the revised final estimates whenever the compared coefficients fall below the prescribed difference threshold.

39. The computer-readable memory of claim 31, wherein the program modules for estimating the intrinsic parameters and estimating the extrinsic parameters comprises sub-modules for:

(a) computing estimates of coefficients of radial distortion attributable to the lens of the camera using initial estimates of the camera's intrinsic parameter set and the coordinates of the image points in each of the captured images;

(b) selecting a previously unselected one of the captured images;

(c) choosing a previously unselected one of the image points in the selected image;

(d) projecting the feature point of the pattern corresponding to the selected image point into the selected image using the initial estimate of an intrinsic parameter set of the camera and an extrinsic parameter set associated with the selected image;

(e) re-computing the image coordinates of the projected feature point to account for radial distortion using the computed estimates of the coefficients of radial distortion and the initial estimate of an intrinsic parameter set;

(f) computing an indicator of the difference between the image coordinates of the selected image point and image coordinates of the corresponding distorted projected feature point;

(g) repeating (c) through (f) for each image point in the selected image;

(h) summing the difference indicators computed for each image point in the selected image to produce a combined difference indicator;

(i) repeating (b) through (h) for each of the captured images;

(j) summing the combined difference indicators to produce a complete maximum likelihood estimate indicator;

(k) generating a series of candidate intrinsic parameter sets for the camera, exclusive of the initial estimated intrinsic parameter set;

(l) selecting a previously unselected one of the candidate intrinsic parameter sets;

(m) computing an estimated extrinsic parameter set for each of the captured images using the selected intrinsic parameter set candidate, the surface coordinates of the feature points of the pattern and the image coordinates of the corresponding images points in the captured images;

(n) computing estimates of the coefficients of radial distortion attributable to the lens of the camera using the selected candidate intrinsic parameter set and the coordinates of the image points in each of the captured images;

(o) selecting one of the captured images;

(p) choosing one of the image points in the selected image;

(q) projecting the feature point of the pattern corresponding to the chosen image point into the selected image using an the selected intrinsic parameter set candidate and the last computed extrinsic parameter set associated with the selected image;

(r) re-computing the image coordinates of the projected feature point to account for radial distortion using the last computed estimates of the coefficients of radial distortion and selected intrinsic parameter set candidate;

(s) computing an indicator of the difference between the image coordinates of the selected image point and image coordinates of the corresponding distorted projected feature point;

(t) repeating (q) and (s) for each remaining image point in the selected image;

(u) summing the difference indicators computed for each image point in the selected image to produce another combined difference indicator;

(v) repeating (p) through (u) for each remaining captured image;

(w) summing the combined difference indicators computed in conjunction with the selected intrinsic parameter set candidate to produce another complete maximum likelihood estimate indicator;

(x) repeating (l) through (w) for each of the candidate intrinsic parameter sets;

(y) identifying the smallest maximum likelihood estimate indicator; and (z) designating the candidate intrinsic parameter set, and the extrinsic parameter set for each image, associated with the smallest maximum likelihood estimate indicator as the final estimates for the intrinsic parameter set and extrinsic parameter sets, respectively.

40. The computer-readable memory of claim 39, wherein the initial estimate of the intrinsic parameter set of the camera and the extrinsic parameter sets associated with each of the captured images are derived beforehand via a deriving program module comprising sub-modules for:

computing a separate homography between the pattern on the planar surface of the object and each of the captured images using the surface coordinates of the feature points of the pattern and the image coordinates of the corresponding images points in the captured image for which the homography is being computed;

estimating the intrinsic parameters of the camera using the homographies computed for the captured images; and estimating the extrinsic parameters for each of the captured images using the estimated intrinsic parameters and the homography associated with the particular image for which the extrinsic parameters are being estimated.

41. The computer-readable memory of claim 39, wherein the submodule for computing an indicator of the difference between the image coordinates of the selected image point and image coordinates of the corresponding distorted projected feature point comprises computing the difference in distance between the image coordinates of the selected image point and image coordinates of the corresponding distorted projected feature point.

42. The computer-readable memory of claim 39, further comprising a program module for refining the estimates of the intrinsic parameter set and extrinsic parameter sets via an iterative procedure, said iteration program module comprising sub-modules for:

assigning a number of iterations to be completed to produce the refined estimates;

for each iteration, computing a new estimate of the intrinsic parameter set and extrinsic parameter sets using the estimates thereof computed in the last iteration as initializing estimates in the current iteration; and assigning the last computed estimates of the intrinsic parameter set and extrinsic parameter sets as the revised final estimates.

\* \* \* \* \*

UNITED STATES PATENT AND TRADEMARK OFFICE
CERTIFICATE OF CORRECTION

PATENT NO.    : 6,437,823 B1
DATED         : August 20, 2002
INVENTOR(S)   : Zhengyou Zhang It is certified that error appears in the above-identified patent and that said Letters Patent is hereby corrected as shown below:

Column 6,
Line 20, equation should appear as follows: $\tilde{M} = [X, Y, Z, 1]^T$ Column 7,
Line 25, equation should appear as follows: $\min_H \sum_i \|m_i - \hat{m}_i\|^2$.

Column 8,
Line 45, equation should appear as follows: $\tilde{m}_\infty = A(r_1 \pm ir_2) = h_1 \pm ih_2$.

Column 10,
Line 22, equation should appear as follows: $\beta = \sqrt{\lambda B_{11}/(B_{11}B_{22} - B_{12}^2)}$ Column 11,
Line 58, equation should appear as follows: $A, \{R_i, t_i \mid i = 1..n\}$ Column 13,
Line 41, equation should appear as follows: $\check{x} = x + x[k_1(x^2 + y^2) + k_2(x^2 + y^2)^2]$ Column 17,
Line 20, equation should appear as follows:

$$h_1^{(2)T} A^{-T} A^{-1} h_2^{(2)} = \frac{\lambda^{(2)}}{\lambda^{(1)}}[(\cos^2\theta - \sin^2\theta)(h_1^{(1)T} A^{-T} A^{-1} h_2^{(1)})$$
$$- \cos\theta \sin\theta (h_1^{(1)T} A^{-T} A^{-1} h_1^{(1)} - h_2^{(1)T} A^{-T} A^{-1} h_2^{(1)})],$$

Signed and Sealed this

Fourth Day of March, 2003

JAMES E. ROGAN
*Director of the United States Patent and Trademark Office*